(12) United States Patent
Yamano

(10) Patent No.: US 7,715,114 B2
(45) Date of Patent: May 11, 2010

(54) ZOOM LENS AND PICKUP APPARATUS

(75) Inventor: Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/457,702

(22) Filed: Jun. 18, 2009

(65) Prior Publication Data

US 2010/0002300 A1 Jan. 7, 2010

(30) Foreign Application Priority Data

Jul. 2, 2008 (JP) ............................ P2008-173096

(51) Int. Cl.
 *G02B 15/14* (2006.01)
(52) U.S. Cl. ...................................... 359/687; 359/683
(58) Field of Classification Search ................. 359/683, 359/687

See application file for complete search history.

(56) References Cited

U.S. PATENT DOCUMENTS

| 6,031,669 A * | 2/2000 | Ohtake ........................ 359/687 |
| 7,268,811 B2 * | 9/2007 | Shirasuna ................ 348/240.3 |

FOREIGN PATENT DOCUMENTS

| JP | 2005-338740 | 12/2005 |
| JP | 2006-023529 | 1/2006 |
| JP | 2006-308957 | 11/2006 |
| JP | 3977150 | 6/2007 |

* cited by examiner

*Primary Examiner*—Scott J Sugarman
(74) *Attorney, Agent, or Firm*—Rader, Fishman & Grauer PLLC

(57) ABSTRACT

Disclosed herein is a zoom lens, including: a first lens group having a positive refracting power; a second lens group having a negative refracting power; a third lens group having a positive refracting power; and a fourth lens group having a positive refracting power; the first, second, third and fourth lens groups being disposed in order from the object side; the first lens group including only a cemented lens including a positive lens and a negative lens cemented in order from the object side and having a generally positive refracting power; the first lens group being configured so as to satisfy the conditional expression $(25 < v_{d11} - v_{d12} < 50)$ where $v_{d11}$ is the Abbe number of the positive lens of the first lens group and $v_{d12}$ is the Abbe number of the negative lens of the first lens group.

15 Claims, 25 Drawing Sheets

FIG.3
— e-LINE
----- g-LINE
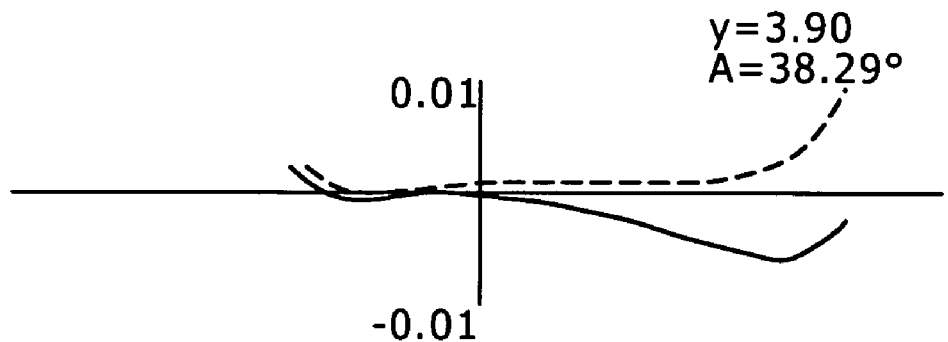
y=3.90
A=38.29°
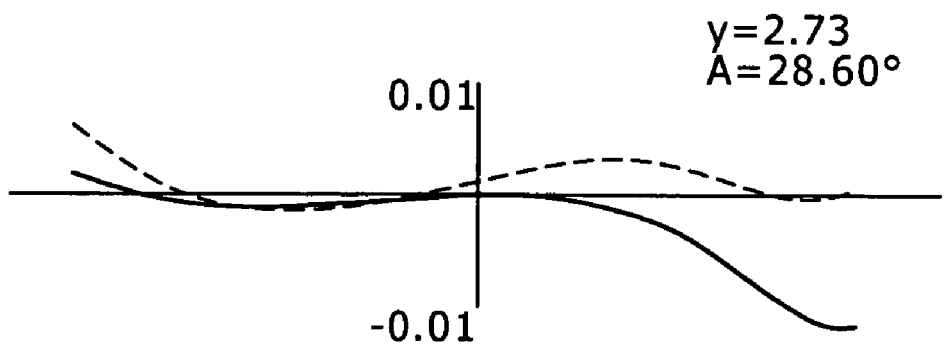
y=2.73
A=28.60°
y=0.0
A=0.00°
LATERAL ABERRATION

FIG.5
— e-LINE
---- g-LINE
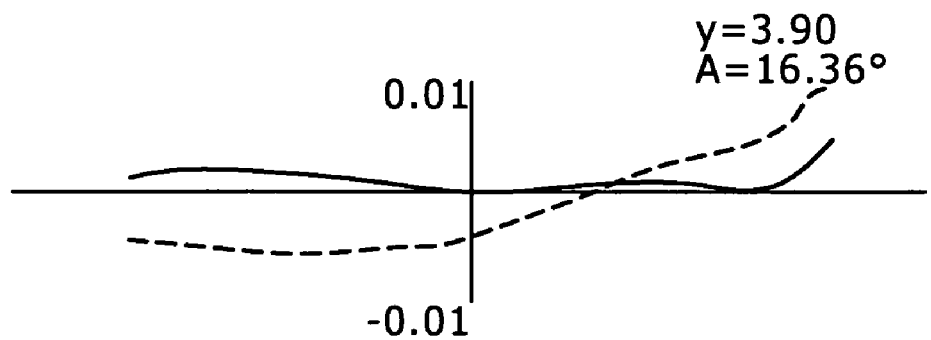
y=3.90
A=16.36°
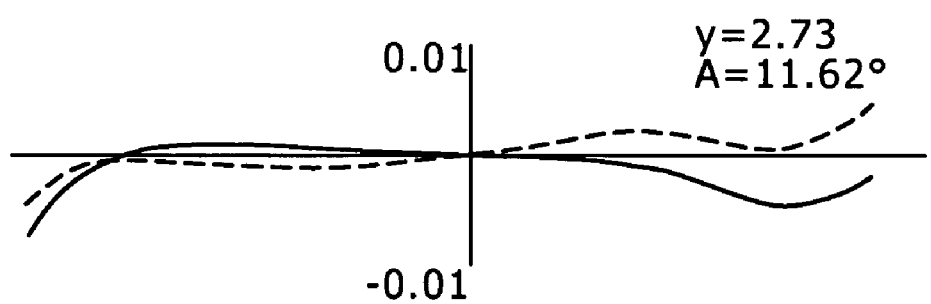
y=2.73
A=11.62°
y=0.0
A=0.00°
LATERAL ABERRATION

FIG.10
— e-LINE
----- g-LINE
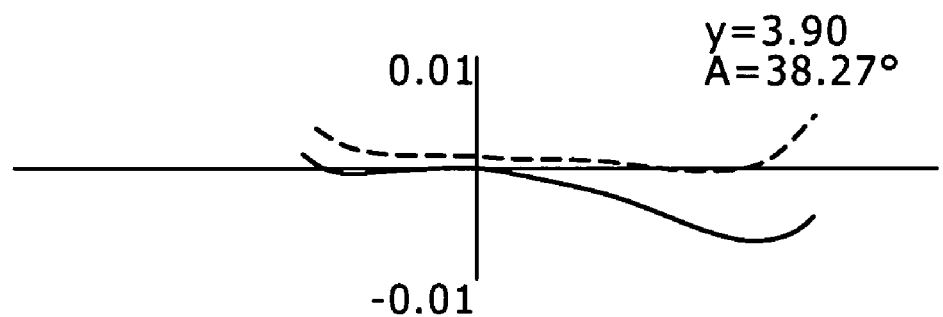
y=3.90
A=38.27°
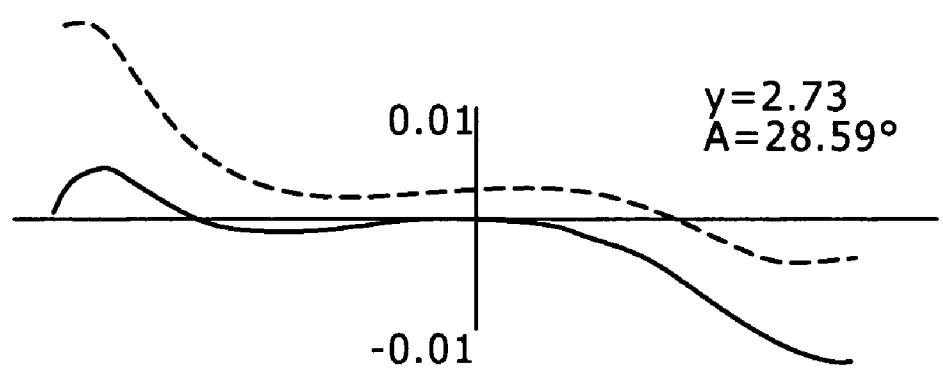
y=2.73
A=28.59°
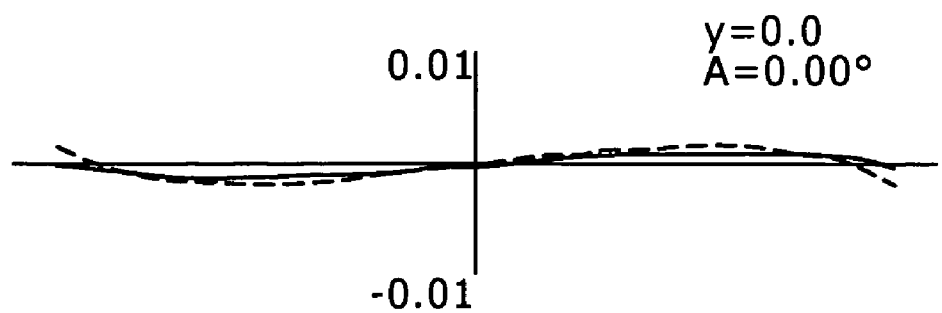
y=0.0
A=0.00°
LATERAL ABERRATION

FIG.12
—— e-LINE
----- g-LINE
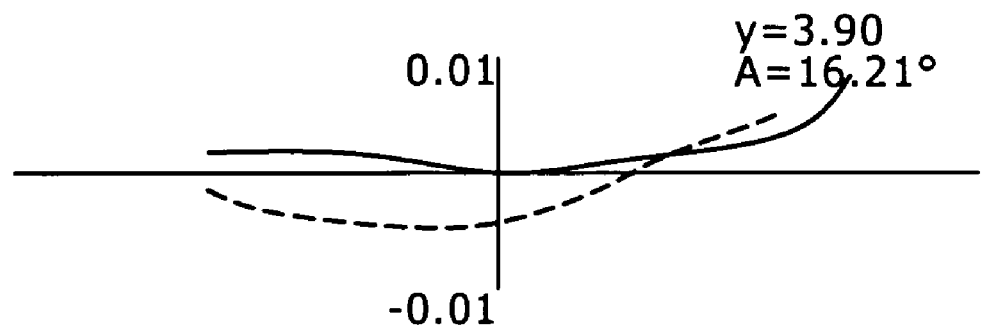
y=3.90
A=16.21°
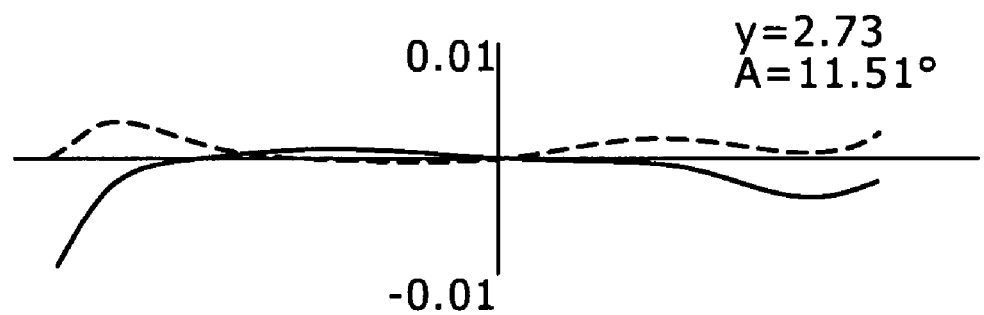
y=2.73
A=11.51°
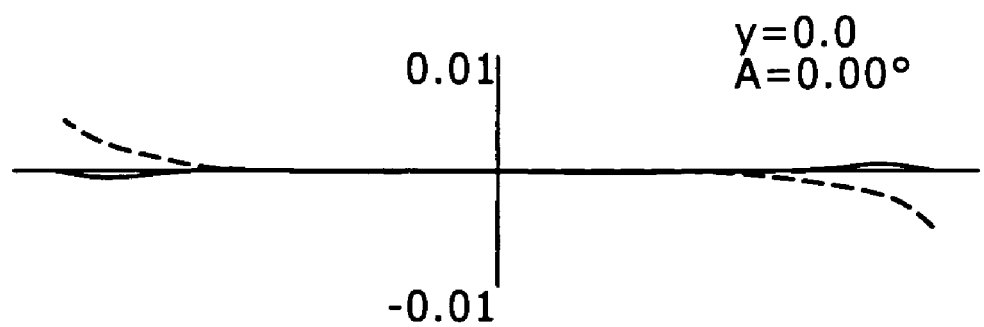
y=0.0
A=0.00°
LATERAL ABERRATION

LATERAL ABERRATION

FIG.17
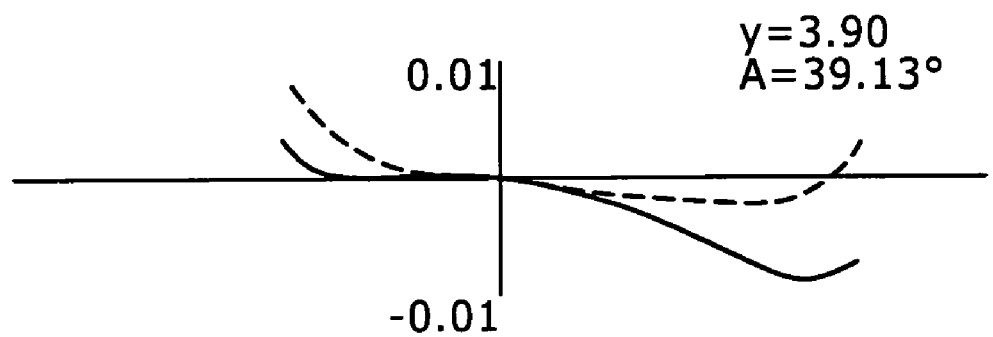
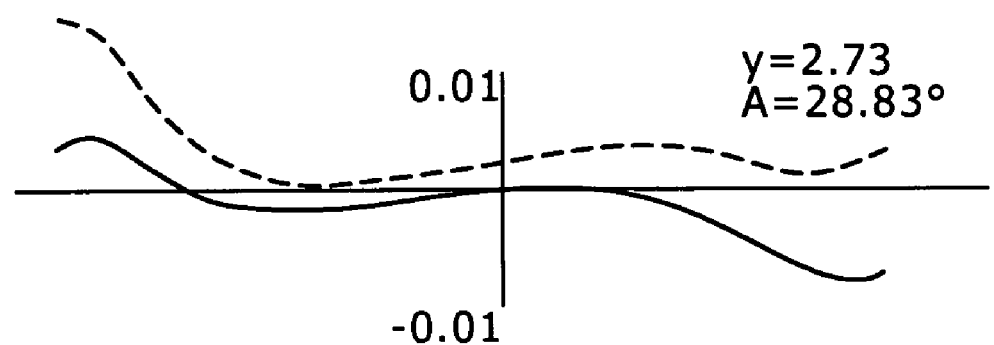
LATERAL ABERRATION

FIG.19
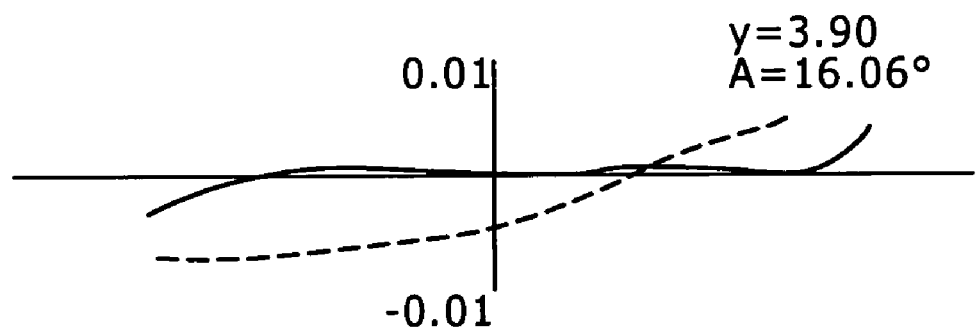
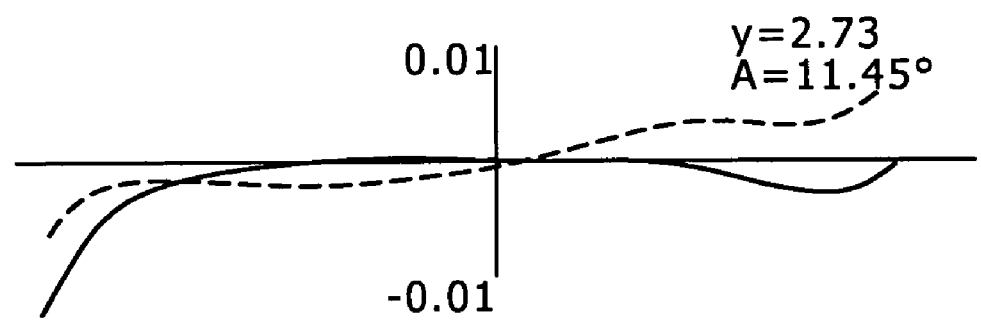
LATERAL ABERRATION

FIG.21
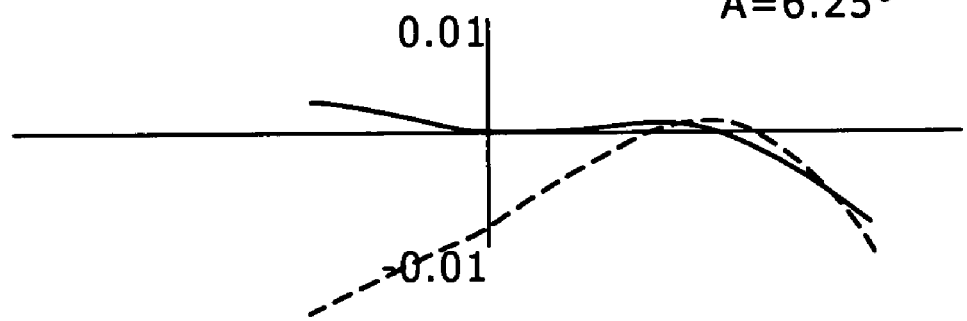
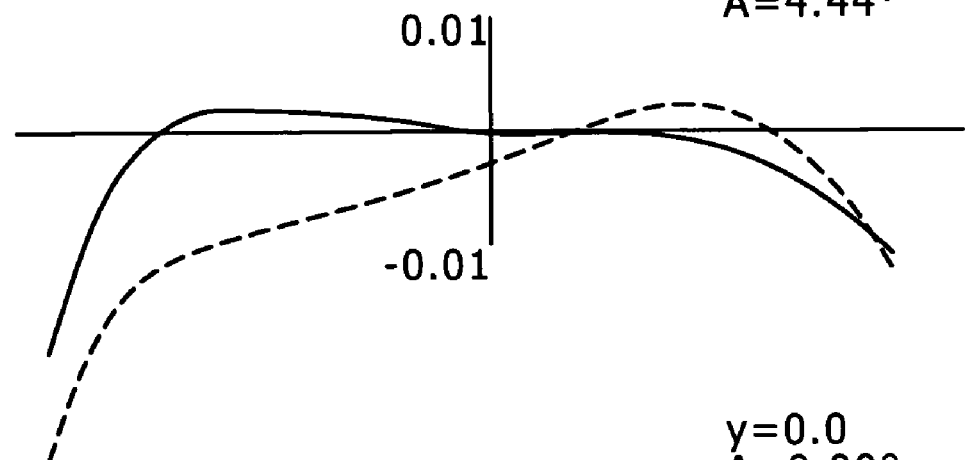
LATERAL ABERRATION

FIG.24
——— e-LINE
----- g-LINE
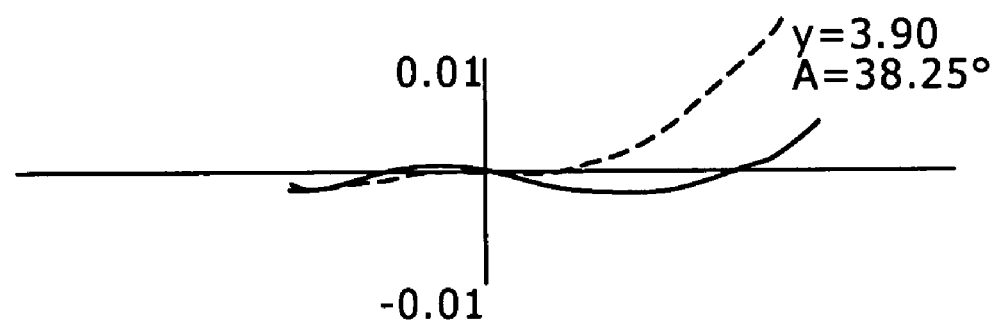
y=3.90
A=38.25°
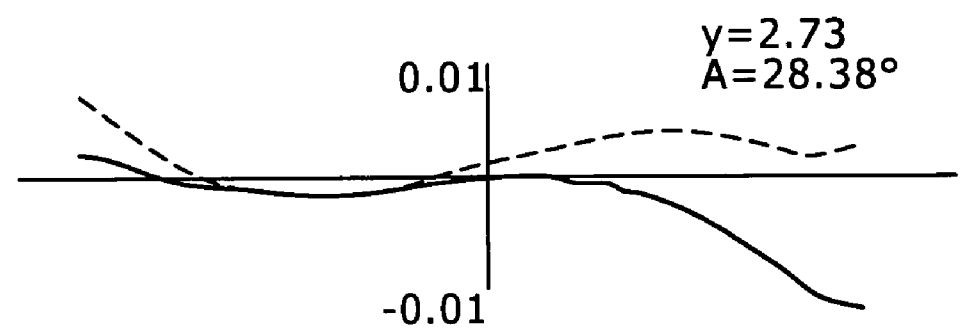
y=2.73
A=28.38°
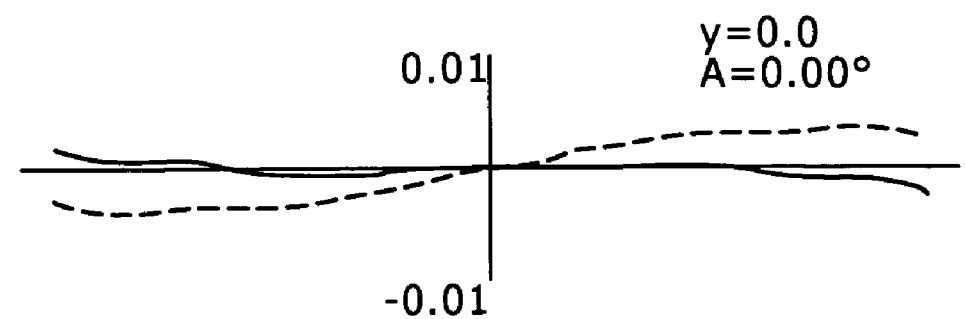
y=0.0
A=0.00°
LATERAL ABERRATION

FIG.26
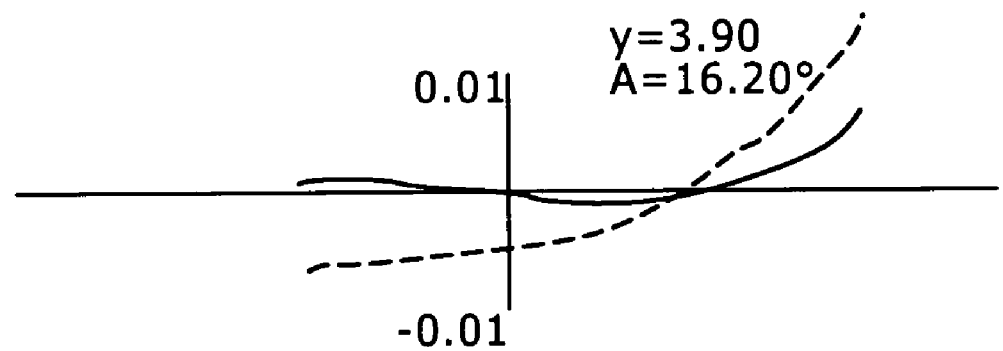
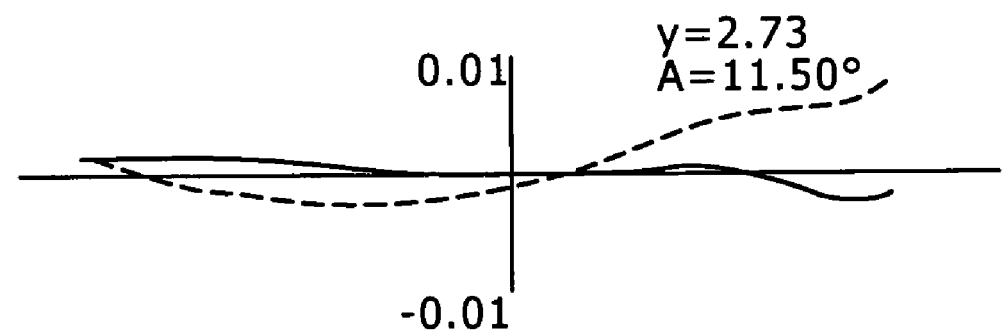
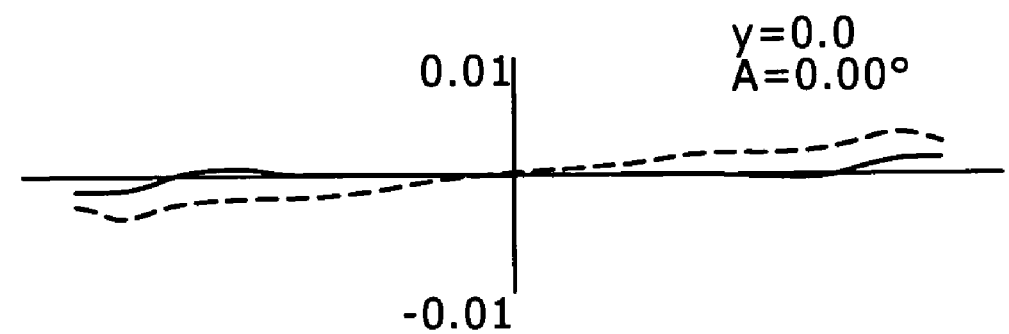
LATERAL ABERRATION

FIG.28
——— e-LINE
------ g-LINE
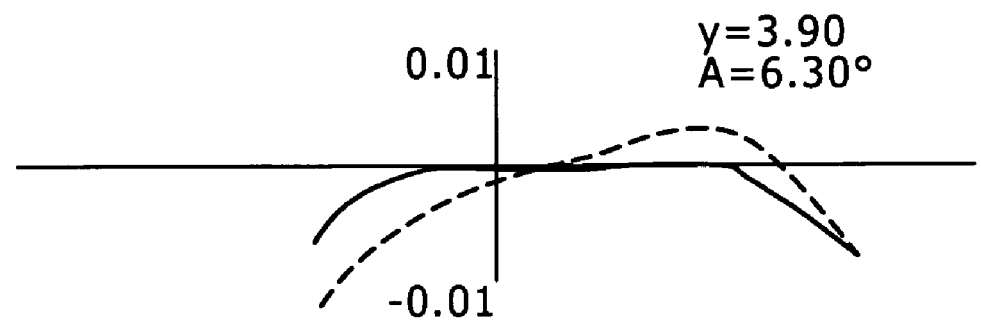
y=3.90
A=6.30°
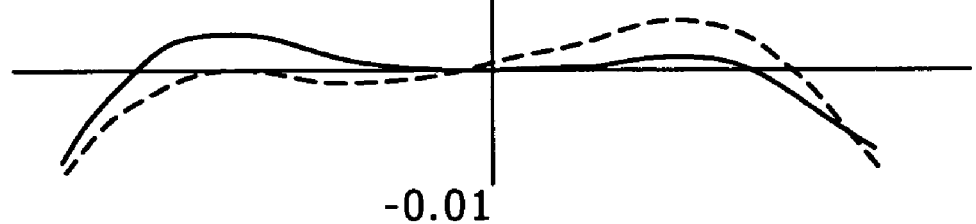
y=2.73
A=4.46°
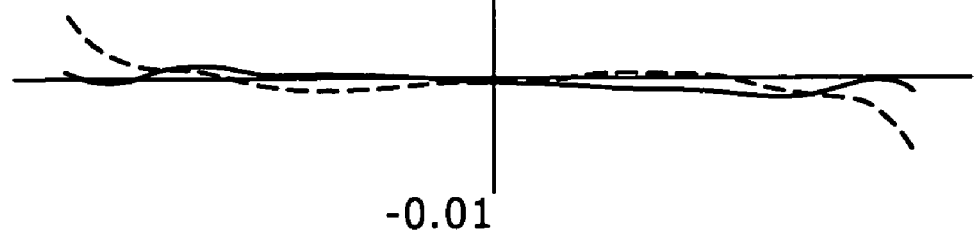
y=0.0
A=0.00°
LATERAL ABERRATION

ZOOM LENS AND PICKUP APPARATUS

BACKGROUND OF THE INVENTION

1. Field of the Invention

This invention relates to a zoom lens suitable for use with a digital still camera, a video camera, a monitoring camera or the like apparatus and an image pickup which includes a zoom lens.

2. Description of the Related Art

In recent years, the market of digital cameras has expanded greatly, and also demands of users for digital cameras are complicated. Demands not only for high picture quality, miniaturization and reduction in thickness but also for increase of the magnification and the image pickup angle of an image pickup lens have increased in recent years.

As one of zoom lenses, a zoom lens of the positive lead type wherein the lens group positioned nearest to the object side has a positive refracting power has an advantage that the zoom rate can be set to a high value. Therefore, the positive lead type zoom lens is used frequently as a zoom lens of the type suitable for such a high zoom rate as is higher than, for example, four times.

Particularly, a four-group zoom lens which includes four lens groups having positive, negative, positive and positive refracting powers in order from the object side is well known as a compact zoom lens of the positive lead type. Such four-group lenses are disclosed, for example, in Japanese Patent Laid-Open No. 2006-23529 (hereinafter referred to as Patent Document 1), Japanese Patent Laid-Open No. 2005-338740 (hereinafter referred to as Patent Document 2), Japanese Patent No. 3,977,150 (hereinafter referred to as Patent Document 3) and Japanese Patent Laid-Open No. 2006-308957 (hereinafter referred to as Patent Document 4).

SUMMARY OF THE INVENTION

Although the zoom lenses disclosed in Patent Documents 1 to 4 are of the positive, negative, positive and positive refracting power type, the zoom lenses disclosed in Patent Documents 1 to 3 fail to achieve a sufficiently high zoom rate. Further, since the zoom lenses are of the zoom type which has a characteristic that the outer diameter of the front lens is generally liable to become great when it is tried to widen the image pickup angle, any of the zoom lenses disclosed in Patent Documents 1 to 3 fails to achieve sufficient widening of the image pickup angle of view and sufficient miniaturization.

Further, in order to achieve widening of the angle and increasing of the magnification of an optical system, it is necessary to carry out sufficient aberration correction, and therefore, usually many lenses are used. Although a zoom lens which achieves high magnification and widening of the angle is disclosed in Patent Document 4, the number of lenses of the first lens group increases from the reason described above, and therefore, the zoom lens disclosed in Patent Document 4 fails to implement sufficient reduction of the size of the optical system.

Accordingly, particularly in a collapsible zoom lens wherein a lens is collapsed to achieve good accommodation when a camera is not used for image pickup, it is very difficult to reduce the number of lenses to reduce the thickness of the camera in a collapsed state. Therefore, development of a small-sized light-weighted zoom lens which overcomes the subject described above together with achievement of increase of the magnification and widening of the angle is demanded strongly.

Further, in an image pickup apparatus which uses a solid-state image pickup element, a zoom lens which has a shape proximate to a telecentric shape on the image side thereof is preferably used because it can provide a uniform field illuminance. As a zoom lens of the type just described, a zoom lens wherein a lens group positioned nearest to the image side has a positive refracting power is suitable.

Therefore, it is desirable to provide a compact zoom lens which has a high zoom rate and a high optical performance over an overall zoom range and can achieve sufficient widening of the image pickup angle and hence is suitable for an image pickup apparatus which uses a solid-state image pickup element as image pickup means and an image pickup apparatus which incorporates the zoom lens.

According to an embodiment of the present invention, there is provided a zoom lens including a first lens group having a positive refracting power, a second lens group having a negative refracting power, a third lens group having a positive refracting power, and a fourth lens group having a positive refracting power, the first, second, third and fourth lens groups being disposed in order from the object side, upon zooming from the wide-angle end to the telephoto end, the first lens group moving so as to increase the distance to the second lens group, the second lens group moving to the image side once and then moving so as to return to the object side, and the third lens group moving to the object side, the first lens group including only a cemented lens including a positive lens and a negative lens cemented in order from the object side and having a generally positive refracting power, the first lens group being configured so as to satisfy the following conditional expression (1):

$$25 < v_{d11} - v_{d12} < 50 \qquad (1)$$

where $v_{d11}$ is the Abbe number of the positive lens of the first lens group and $v_{d12}$ is the Abbe number of the negative lens of the first lens group.

In the zoom lens, since the first lens group is composed only of the cemented lens, the thickness of the lens group can be reduced. Further, where the conditional expression (1) is satisfied, chromatic aberration correction can be carried out favorably over the overall range of the zoom rate.

Thus, according to the embodiment of the present invention, a compact zoom lens which has a high zoom rate and a high optical performance over an overall zoom range and can achieve sufficient widening of the image pickup angle and an image pickup apparatus which incorporates the zoom lens can be provided.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a diagrammatic view illustrating lateral aberrations at the wide-angle end of the zoom lens of FIG. 1;

FIG. 5 is a diagrammatic view illustrating lateral aberrations at the intermediate focus position of the zoom lens of FIG. 1;

FIG. 10 is a diagrammatic view illustrating lateral aberrations at the wide-angle end of the zoom lens of FIG. 8;

FIG. 12 is a diagrammatic view illustrating lateral aberrations at the intermediate focus position of the zoom lens of FIG. 8;

FIG. 17 is a diagrammatic view illustrating lateral aberrations at the wide-angle end of the zoom lens of FIG. 15;

FIG. 19 is a diagrammatic view illustrating lateral aberrations at the intermediate focus position of the zoom lens of FIG. 15;

FIG. 21 is a diagrammatic view illustrating lateral aberrations at the telephoto end of the zoom lens of FIG. 15;

FIG. 24 is a diagrammatic view illustrating lateral aberrations at the wide-angle end of the zoom lens of FIG. 22;

FIG. 26 is a diagrammatic view illustrating lateral aberrations at the intermediate focus position of the zoom lens of FIG. 22;

FIG. 28 is a diagrammatic view illustrating lateral aberrations at the telephoto end of the zoom lens of FIG. 22.

DETAILED DESCRIPTION OF THE PREFERRED EMBODIMENT

Figure 1:
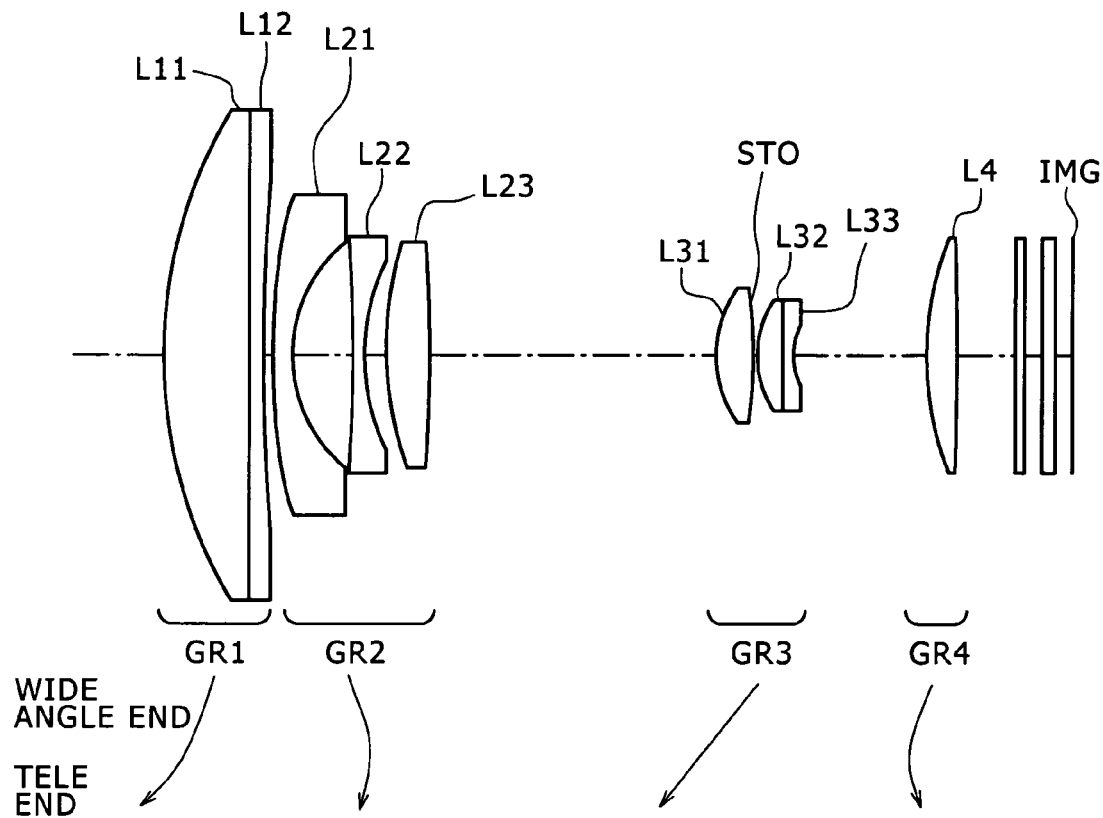
FIG. 1 is a sectional view of a zoom lens according to a first working example of the present invention.

In the following, a zoom lens and an image pickup apparatus to which an embodiment of the present invention is applied are described in detail.

<Zoom Lens>

A zoom lens to which an embodiment of the present invention is applied has the following configuration. In particular, the zoom lens has a high zoom rate or magnifying power and a wide angle of view and is compact. To this end, the zoom lens includes a first lens group having a positive focal distance, a second lens group having a negative focal distance, a third lens group having a positive focal distance and a fourth lens group having a positive focal distance, disposed in order from the object side. The zoom lens varies the air gap between the lens groups to carry out zooming from the wide-angle end to the telephoto end.

In particular, upon zooming from the wide-angle end to the telephoto end, the first lens group moves so as to increase the distance to the second lens group and the second lens group moves to the image side once and then moves so as to return to the object side, and the third lens group moves to the object side. By the movements, miniaturization of the optical system and a high zoom rate can be achieved simultaneously.

It is to be noted that also the fourth lens group may move upon zooming. Particularly upon zooming from the wide-angle end to the telephoto end, if the fourth lens group moves to the object side once and then moves back to the image side, then the power variation action is further raised and also it is possible to achieve reduction of the overall length of the optical system.

Further, a member for determining the F number such as an aperture stop moves integrally with the third lens group also upon zooming. Further, the third lens group corrects an image shake or camera shake by moving in a perpendicular direction to the optical axis.

In the zoom lens, the first lens group includes only a cemented lens including a positive lens and a negative lens cemented in order from the object side and having a generally positive refracting power and is configured so as to satisfy the following conditional expression (1):

$$25 < v_{d11} - v_{d12} < 50 \tag{1}$$

where $v_{d11}$: the Abbe number of the positive lens of the first lens group, and $v_{d12}$: the Abbe number of the negative lens of the first lens group.

Since the first lens group is formed only from such a cemented lens as described above, it can be formed with a small thickness, and consequently, the camera size when the zoom lens is in a collapsed state can be reduced. Further, since the two lenses are cemented, the mounting error of the lenses upon fabrication of the zoom lens can be reduced to an infinitely low level, and besides, it is possible to simplify the structure of a lens frame. Consequently, it is possible to achieve enhancement of an optical system performance and reduction of the cost simultaneously in addition to reduction in size and thickness.

The conditional expression (1) above defines the difference between the Abbe number of the material of the positive lens and the Abbe number of the material of the negative lens in the cemented lens which forms the first lens group. If the materials for the lenses are selected such that the difference comes out of the lower limit of the conditional expression (1), then it is difficult to correct chromatic aberration.

Particularly since off-axis chromatic aberration in a zoom region on the wide-angle side and on-axis chromatic aberration in another zoom region on the telephoto side appear significantly, image deterioration is invited. In addition, if the difference described above comes out of the lower limit of the conditional expression (1), then either the value of $v_{d11}$ decreases or the value of $v_{d12}$ increases. In the former case, chromatic aberration which appears with the positive lens when it is tried to achieve widening of the angle and increase of the magnification becomes great. In the latter case, it becomes difficult to carry out chromatic aberration correction of the negative lens favorably.

On the other hand, if the cemented lens of the first lens group is formed such that the difference described above comes out of the upper limit of the conditional expression (1), then the Abbe number of the material of the negative lens becomes excessively low, which is not preferable. Since generally a glass material having a low Abbe number exhibits increasing partial dispersion together with dispersion, particularly with a zoom lens of a high zoom rate, the secondary spectrum on the telephoto side is likely to increase.

In the zoom lens of the present embodiment, the positive lens which composes the first lens group is formed from a biconvex lens. Where the positive lens which composes the first lens group is formed from a biconvex lens, chromatic aberration which appears on the lens face of the first lens group which is positioned nearest to the object side can be corrected favorably at the cemented lens plane. The zoom lens is configured further preferably such that the curvature of the positive lens of the first lens group satisfies the following conditional expressions (13) and (14):

$$3.0 < R11/IH < 7.0 \quad (13)$$

$$(IH \times 100)/|R12| < 4.0 \quad (14)$$

where

R11: the radius of curvature of the lens face of the first lens group positioned nearest to the object side R12: the radius of curvature of the cemented lens plane in the first lens group IH: the maximum image height The conditional expressions (13) and (14) define the curvature of the biconvex lens which composes the first lens group. If the lower limit of the conditional expression (13) is exceeded to increase the curvature of the face defined by R11, then various aberrations appearing on the plane defined by R11 increase and give rise to image deterioration. On the other hand, if the upper limit of the conditional expression (13) is exceeded to decrease the curvature of the face defined by R11, then the incident angle of an off-axis light flux incident to the plane defined by R11 from the object side becomes great. Consequently, occurrence of off-axis aberration upon widening of the angle of the optical system increases. Besides, since the refracting power of the paraxial theory on the plane defined by R11 decreases, also the positive refracting power of the first lens group decreases and also miniaturization of the optical system becomes difficult.

On the other hand, if the curvature of the plane defined by R12 becomes high exceeding the upper limit of the conditional expression (14), then this signifies that the curvature of the cemented lens plane becomes excessively high and it becomes difficult for chromatic aberration correction, which is carried out on the cemented lens plane, to exhibit an effect in a well-balanced state over the overall zoom region. Therefore, it becomes impossible to achieve all of increase of the magnification, widening of the angle and enhancement of a performance simultaneously.

Further, in the zoom lens, preferably the face defined by R11 is formed as an aspheric face. This makes it possible to reduce various aberrations which appear on this face, particularly off-axis aberration on the wide-angle side and spherical aberration on the telephoto side, and consequently, an optical performance is further improved.

The zoom lens of the present embodiment is configured such that the first lens group satisfies the following conditional expressions (2) and (3):

$$7.0 < f1/IH < 14 \quad (2)$$

$$2.2 < f1/\sqrt{(fw \cdot ft)} < 3.6 \quad (3)$$

where f1: the focal distance of the first lens group

IH: the maximum image height fw: the focal distance of the entire system at the wide-angle end ft: the focal distance of the entire system at the telephoto end The conditional expressions (2) and (3) define the refracting power of the first lens group, and if the refracting power comes out of the lower limits, then it becomes difficult to correct the aberrations, and therefore, image deterioration is invited. On the other hand, if the refracting power comes out of the upper limits of the conditional expressions (2) and (3), then the refracting power of the first lens group becomes excessively low and it becomes difficult to achieve increase of the magnification, widening of the angle and reduction in size simultaneously. By setting the refracting power of the first lens group as defined by the conditional expressions (2) and (3), increase of the magnification and miniaturization of the optical system can be implemented while the first lens group is configured in a small size only from a cemented lens.

In the zoom lens of the present embodiment, the lens face of the first lens group positioned nearest to the image side has a concave shape to the image side. By this configuration, correction of off-axis aberrations on the wide-angle side, particularly correction of comatic aberration, and correction of spherical aberration on the telephoto side can be carried out favorably. Consequently, widening of the angle, increase of the magnification and improvement of an optical performance are achieved.

Preferably, the zoom lens is configured such that the lens face described above satisfies the following conditional expression (15):

$$0.01 < IH/R13 < 0.1 \quad (15)$$

where

R13: the radius of curvature of the lens face of the first lens group positioned nearest to the image side IH: the maximum image height The conditional expression (15) defines the curvature of the face defined by R13. If the curvature of the face defined by R13 comes out of the lower limit of the conditional expression (15), then since emergent angle of a light flux emerging from the face defined by R13 toward the image side becomes excessively great, it becomes difficult to correct off-axis aberration particularly on the wide-angle side and spherical aberration on the telephoto side. On the other hand, even if the curvature of the curve defined by R13 comes out of the upper limit of the conditional expression (15), correction of various aberrations cannot be carried out well undesirably. Further, preferably the face defined by R13 is formed as an aspheric face. By this configuration, the effect achieved where the conditional expression (15) is satisfied, that is, the correction effect of off-axis aberration on the wide-angle side and spherical aberration on the telephoto side, can be further enhanced.

The zoom lens of the present embodiment clears the subject described hereinabove by configuring the first lens group in such a manner as described above, and in order to achieve this configuration, it is significant to dispose and cement the positive lens and the negative lens of the first lens group in order from the object side.

In the zoom lens of the present embodiment, the second lens group includes at least one lens pair which includes a negative lens and a positive lens disposed in order from the object side and may be formed from a cemented lens or a plurality of single lenses, and satisfies the following conditional expressions (4) to (6):

$$1.0 < |f2/fw| < 1.6 \quad (4)$$

$$15 < \nu_{d2}n - \nu_{d2}p < 35 \quad (5)$$

$$n_d P > 1.75 \quad (6)$$

where f2: the focal distance of the second lens group fw: the focal distance of the entire system at the wide-angle end $\nu_{d2}n$: an average value of the Abbe number of all negative lenses disposed in the second lens group $\nu_{d2}p$: an average value of the Abbe number of all positive lenses disposed in the second lens group $n_dp$: an average value of the refractive index of all positive lenses disposed in the second lens group Where the second lens group is configured in such a manner as described above, it exhibits an effect that particularly various off-axis aberrations on the wide-angle side and on-axis aberrations at the telephoto end are corrected favorably.

The conditional expression (4) defines the refracting power of the second lens group. If the lower limit of the conditional expression (4) is exceeded to increase the refracting power of the second lens group, then it becomes difficult to correct aberration, resulting in picture quality deterioration. On the other hand, if the upper limit of the conditional expression (4) is exceeded, then the refracting power of the second lens group becomes short, and it becomes difficult to achieve miniaturization and increase of the magnification of the optical system.

The conditional expression (5) defines the difference between the average value of the Abbe number of all negative lenses disposed in the second lens group and the average value of the Abbe number of all positive lenses. If the second lens group is configured such that the upper limit or the lower limit of the conditional expression (5) is exceeded, then it becomes difficult to correct off-axis aberrations on the wide-angle side and on-axis chromatic aberration on the telephoto side. Consequently, it becomes difficult to achieve increase of the magnification and widening of the angle of the optical system.

The conditional expression (6) defines the average value of the refractive index of all positive lenses disposed in the second lens group. If the average value becomes lower exceeding the lower limit of the conditional expression (6), then since the Petzbar sum of the second lens group increases in the negative direction, it becomes difficult to correct the curvature of field when it is intended to achieve increase of the magnification and widening of the angle of the optical system.

Further, in the zoom lens, the advantage described above becomes further effective if the second lens group is composed of three lenses including negative, negative and positive power lenses disposed in order from the object side and satisfies the following conditional expressions (4), (7) and (8):

$$1.0 < |f2/fw| < 1.6 \quad (4)$$

$$15 < \{(\nu_{d21} + \nu_{d22})/2\} - \nu_{d23} < 30 \quad (7)$$

$$n_{d23} > 1.84 \quad (8)$$

where f2: the focal distance of the second lens group fw: the focal distance of the entire system at the wide-angle end $\nu_{d21}$: the Abbe number of the negative lens of the second lens group disposed nearest to the object side $\nu_{d2s}$: the Abbe number of the negative lens of the second lens group disposed second nearest to the object side $\nu_{d23}$: the Abbe number of the positive lens of the second lens group disposed nearest to the image side $n_{d23}$: the refractive index of the positive lens of the second lens group positioned nearest to the image side The zoom lens satisfies the following conditional expressions (9) and (10) regarding movement of the second lens group upon zooming from the wide-angle end to the telephoto end:

$$0.7 < |\Delta WM2|/IH < 1.2 \quad (9)$$

$$|\Delta WT2|/IH < 0.7 \quad (10)$$

where $\Delta$WM2: the distance from the position of the second lens group at the wide-angle end to the position of the second lens group at an intermediate focal position (fm=√(fw·ft))

$\Delta$WT2: the distance from the position of the second lens group at the wide-angle end to the position of the second lens group at the telephoto-end IH: the maximum image height The conditional expressions (9) and (10) define the stroke of movement of the second lens group upon zooming. If the stroke of movement of the second lens group becomes excessively great exceeding the upper limit of the conditional expression (9) or (10), then the thickness of a cam ring for moving the second lens group in the direction of the optical axis becomes great. Therefore, it becomes difficult to reduce the camera size in a collapsed state of the zoom lens. On the other hand, if the lower limit of the conditional expression (9) is exceeded, then the stroke of movement of the second lens group becomes excessively small, and therefore, it becomes difficult to reduce the size of the overall length of the optical system.

In the zoom lens of the present embodiment, the third lens group includes at least one cemented lens formed from positive and negative lenses and the glass materials of the cemented lens satisfy the following expression (11):

$$25 < \nu_{d3}p - \nu_{d3}n < 70 \quad (11)$$

where $\nu_{d3}p$: the Abbe number of the positive lens which composes the third lens group $\nu_{d3}n$: the Abbe number of the negative lens which composes the third lens group If the cemented lens in the third lens group is formed such that the lower limit of the conditional expression (11) is exceeded, then appearance of chromatic aberration in the third lens increases, and therefore, it becomes difficult to raise the magnification of the optical system. On the other hand, if the cemented lens is configured such that the upper limit of the conditional expression (11) is exceeded, then since the refractive index of the positive lens which composes the third lens group is liable to become low, the positive refracting power of the entire third lens group becomes short. Consequently, it becomes difficult to implement a sufficiently high magnification.

In the zoom lens of the present embodiment, the focal distances of the third and fourth lens groups satisfy the following conditional expression (12):

$$0.25 < f3/f4 < 1.0 \quad (12)$$

where f3: the focal distance of the third lens group f4: the focal distance of the fourth lens group The conditional expression (12) defines the focal distance ratio between the third and fourth lens groups. If the focal distance ratio comes out of the lower limit, then the refracting power of the fourth lens group becomes low and the aberration variation during zooming becomes great, resulting in difficulty to achieve a high magnification. On the other hand, if the upper limit is exceeded, then the refracting power of the third lens group becomes low and the overall length becomes long, resulting in difficulty to achieve reduction in size.

The fourth lens group of the zoom lens of the present embodiment may be formed from a single lens component having a positive refracting power. Further, in order to form the zoom lens of the present embodiment so as to be simple and have a high performance, the fourth lens group may be formed from a single lens having at least one aspheric face and having a positive refracting power.

Further, the fourth lens group causes the optical system to approach an image side telecentric optical system. Consequently, the fourth lens group plays a role as a field lens so as to be suitable for an image pickup apparatus which forms an image on a solid-state image pickup element through the first to fourth lens groups.

Preferably, focusing is carried out by the fourth lens group which includes a comparatively small number of lens components. This makes it possible to reduce the size of a focusing lens unit and is advantageous also in reduction of the load to a focusing actuator and in reduction of the power consumption.

Further, the advantages of the zoom lens of the present embodiment become further effective if the fourth lens group is composed of a single positive lens produced by plastic molding. In addition, it becomes possible to achieve reduction in weight and cost of the focusing lens unit.

WORKING EXAMPLES

In the following, four particular working examples of the zoom lens according to the embodiment of the present invention are described. FIGS. 1 to 28 show lens configurations and several aberrations of the working examples. Further, data of the optical system in the working examples are indicated in Tables 1, 5, 9 and 13. Meanwhile, variation distances in the working examples upon power variation are indicated in Tables 2, 6, 10 and 14; aspheric coefficients of the aspheric faces in the working examples are indicated in Tables 3, 7, 11 and 15; and conditional expression numerical values in the working examples are indicated in Tables 4, 8, 12 and 16.

It is to be noted that reference characters used in the numerical value working examples have the following meanings:

FNo: the F number f: the focal distance

ω: the half angle of view si: the ith face as counted from the object side ri: the radius of curvature of the ith face si di: the face distance between the ith face and the i+1th face from the object side ni: the refractive index at the d-line (wavelength: 587.6 nm) of the ith lens vi: the Abbe number at the d-line (wavelength: 587.6 nm) of the ith lens Meanwhile, the aspheric shape is defined by the following expression:

$$x = cy^2/(1+(1-(1+k)c^2y^2)^{1/2}) + Ay^4 + By^6 + \ldots$$

where x: the distance from the lens face top in the optical axis direction y: the height in a direction perpendicular to the optical axis c: the paraxial curvature at the top of the lens k: the conic constant A, B, . . . : the aspheric constant Further, in the numerical value examples described below, the term "ASP" in the tables indicates that the face is formed in an aspheric shape; "STO" indicates that the face is formed as an aperture stop; and "INFINITY" indicates that the face is formed from a flat face.

Working Example 1

FIG. 1 shows a configuration of a zoom lens according to the working example 1. Referring to FIG. 1, the zoom lens includes a first lens group GR1 having a positive refracting power, a second lens group GR2 having a negative refracting power, a third lens group GR3 having a positive refracting power, and a fourth lens group GR4 having a positive refracting power, disposed in order from the object side. In the zoom lens, upon zooming from the wide-angle end to the telephoto end, the first lens group GR1 moves so as to increase the distance to the second lens group GR2, and the second lens group GR2 moves to the image side once and then moves so as to return to the object side. Further, the third lens group GR3 moves to the object side.

The first lens group GR1 is composed only of a cemented lens including a positive lens L11 and a negative lens L12 cemented in order from the object side and generally has a positive refracting power. The second lens group GR2 is composed of a negative lens L21, another negative lens L22 and a positive lens L23 disposed in order from the object side and generally has a negative refracting power. The third lens group GR3 is composed of a positive lens L31, an aperture stop STO, another positive lens L32 and a negative lens L33 disposed in order from the object side and generally has a positive refracting power. The fourth lens group GR4 is composed of a positive lens L4 and generally has a positive refracting power.

Figure 2:
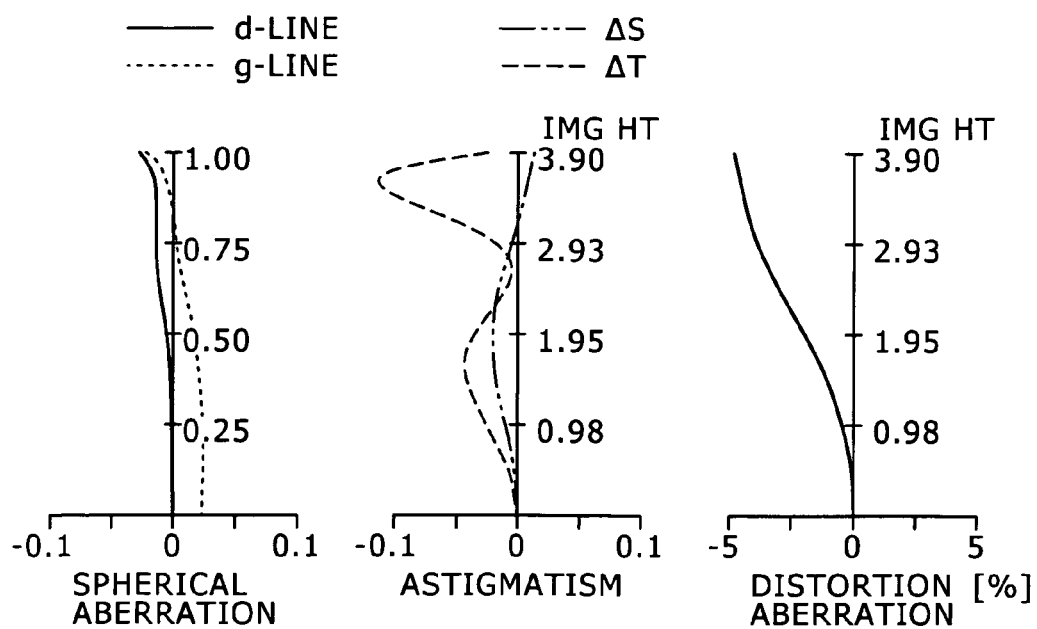
FIG. 2 is a diagrammatic view illustrating longitudinal aberrations at the wide-angle end of the zoom lens of FIG. 1.
Figure 4:
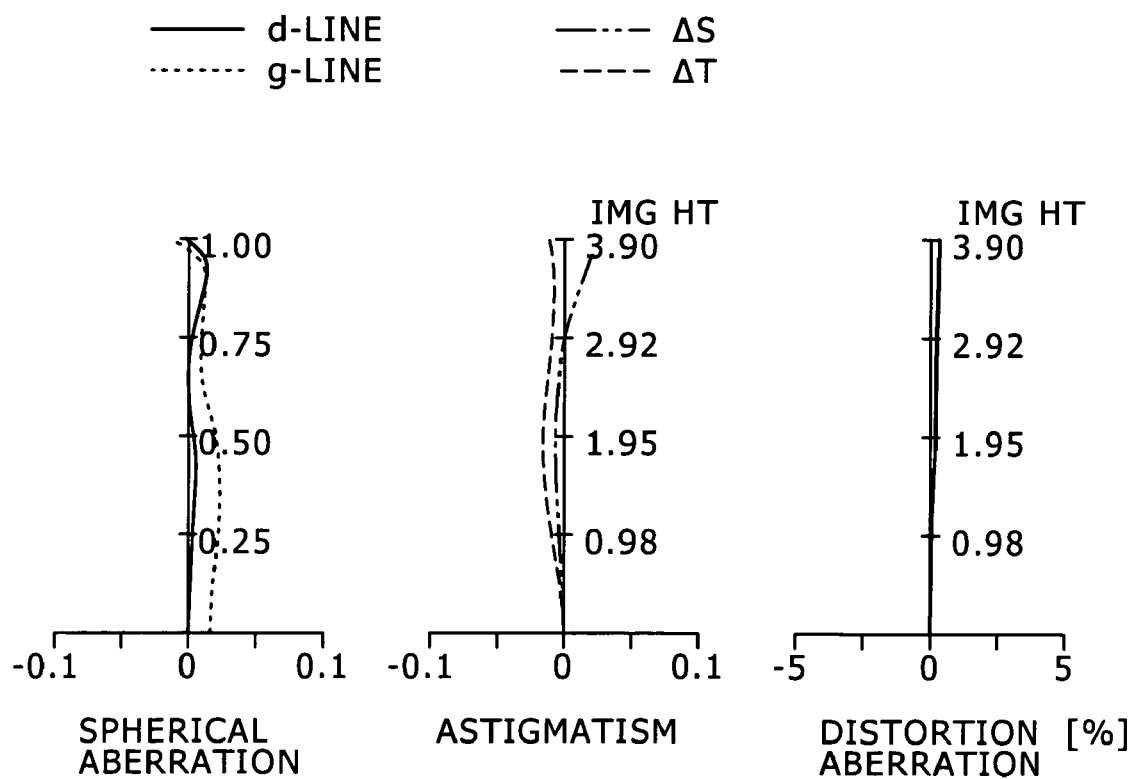
FIG. 4 is a diagrammatic view illustrating longitudinal aberrations at an intermediate focus position of the zoom lens of FIG. 1.
Figure 6:
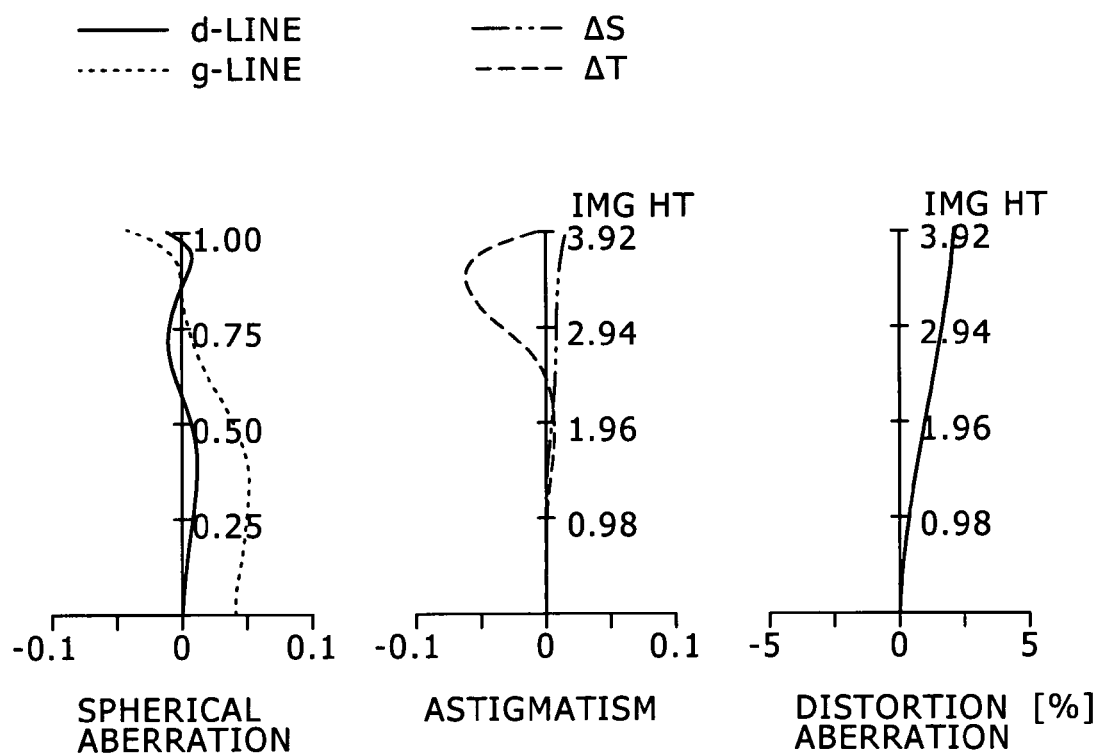
FIG. 6 is a diagrammatic view illustrating longitudinal aberrations at the telephoto end of the zoom lens of FIG. 1.
Figure 7:
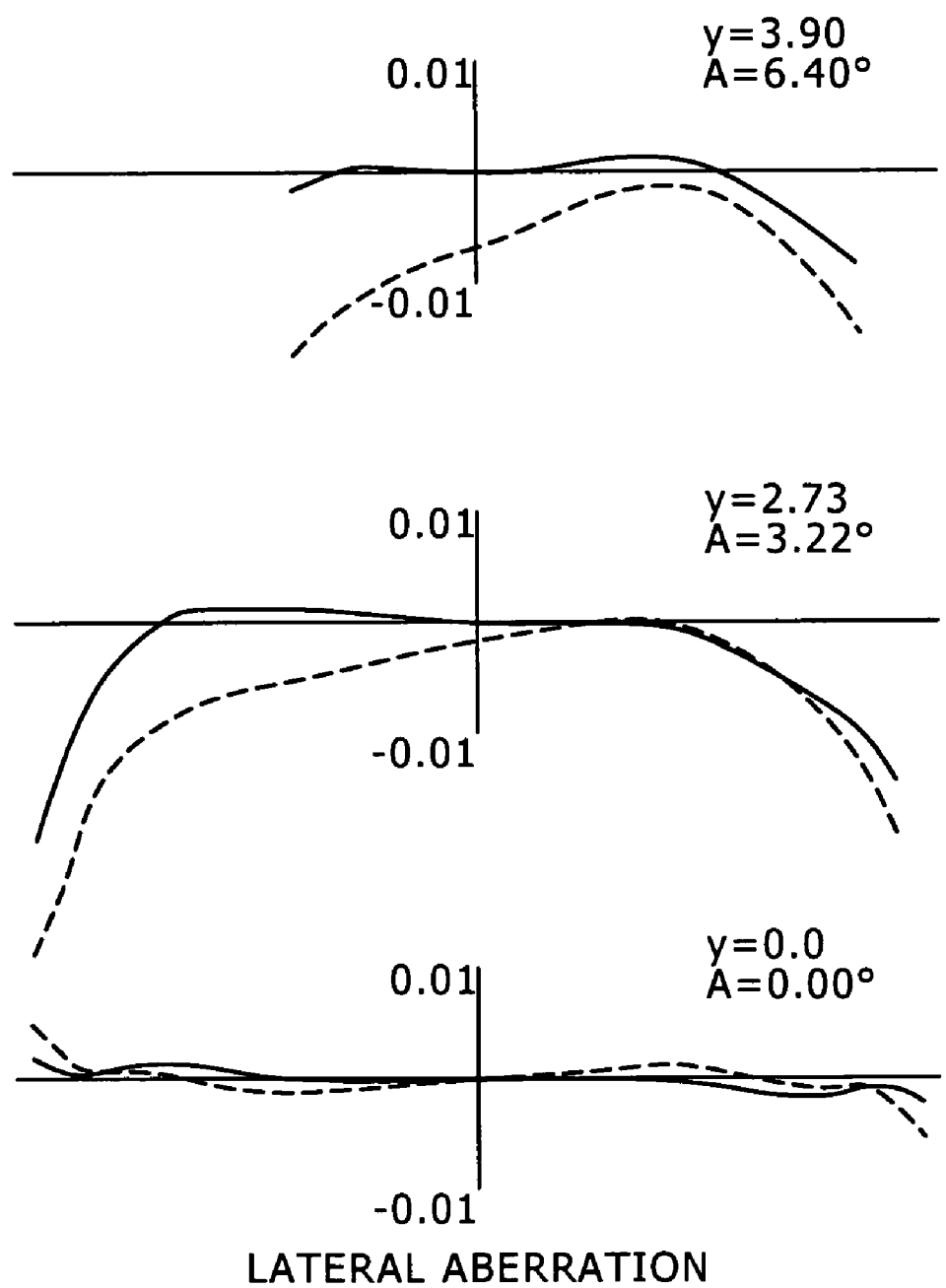
FIG. 7 is a diagrammatic view illustrating lateral aberrations at the telephoto end of the zoom lens of FIG. 1.

FIG. 2 illustrates longitudinal aberrations at the wide-angle end of the zoom lens of the working example 1. FIG. 3 illustrates lateral aberrations at the wide-angle end of the zoom lens of the working example 1. FIG. 4 illustrates the longitudinal aberrations at an intermediate focal position of the zoom lens of the working example 1. FIG. 5 illustrates the lateral aberrations at the intermediate focal position of the zoom lens of the working example 1. FIG. 6 illustrates the longitudinal aberrations at the telephoto end of the zoom lens of the working example 1. FIG. 7 illustrates the lateral aberrations at the telephoto end of the zoom lens of the working example 1.

Data of the optical system in the working example 1 are indicated in Table 1; variation distances upon power variation of the working example 1 are indicated in Table 2; aspheric constants of the aspheric faces in the working example 1 are indicated in Table 3; and conditional expression numerical values in the working example 1 are indicated in Table 4.

TABLE 1 f = 5.20~34.29 FNo = 3.26~5.51 ω = 38.50~6.40

| si | ri | di | ni | vi |
|---|---|---|---|---|
| 1 (ASP) | 18.250 | 3.340 | 1.66955 | 55.400 |
| 2 | −2183.690 | 0.500 | 1.94595 | 17.980 |
| 3 | 96.053 | (d 3) | | |
| 4 (ASP) | 758.839 | 0.720 | 1.85135 | 40.100 |
| 5 (ASP) | 6.899 | 2.270 | | |
| 6 | −47.588 | 0.500 | 1.81600 | 46.570 |
| 7 | 8.072 | 0.800 | | |
| 8 (ASP) | 10.356 | 1.663 | 1.90680 | 21.200 |
| 9 (ASP) | 192.345 | (d 9) | | |
| 10 (ASP) | 4.528 | 1.420 | 1.69350 | 53.200 |
| 11 (ASP) | −15.000 | 0.000 | | |
| STO | INFINITY | 0.150 | | |
| 13 | 3.900 | 1.000 | 1.49700 | 81.610 |
| 14 | −43.179 | 0.350 | 1.90366 | 31.320 |
| 15 | 2.960 | (d 15) | | |
| 16 (ASP) | 11.471 | 1.200 | 1.52470 | 56.460 |
| 17 (ASP) | −172.339 | (d 17) | | |
| 18 | INFINITY | 0.300 | 1.51680 | 64.200 |
| 19 | INFINITY | 0.750 | | |
| 20 | INFINITY | 0.500 | 1.55671 | 58.562 |
| 21 | INFINITY | 0.600 | | |
| IMG | INFINITY | | | |

TABLE 2

Variation distance

| f | 5.2 | 13.24 | 34.29 |
|---|---|---|---|
| d 3 | 0.350 | 8.000 | 16.600 |
| d 9 | 10.935 | 3.296 | 0.350 |
| d 15 | 4.985 | 4.687 | 12.287 |
| d 17 | 2.250 | 6.251 | 4.500 |

TABLE 3

Aspheric coefficient

| si | K | A | B | C | D |
|---|---|---|---|---|---|
| 1 | 0.00000E+00 | −2.06413E−06 | −3.74390E−08 | 4.70427E−10 | −3.26858E−12 |
| 4 | 0.00000E+00 | 9.36954E−04 | −1.47440E−05 | 1.97110E−07 | −2.95845E−09 |
| 5 | 0.00000E+00 | 6.81593E−04 | 4.69463E−05 | −8.45045E−07 | 6.67494E−08 |
| 8 | 0.00000E+00 | −9.87670E−04 | 2.51897E−05 | −6.15310E−06 | 3.12460E−07 |
| 9 | 0.00000E+00 | −7.84495E−04 | −1.16576E−06 | −3.15051E−06 | 1.87203E−07 |
| 10 | 0.00000E+00 | −6.24519E−04 | −2.09471E−05 | −1.13662E−07 | 1.51498E−06 |
| 11 | 0.00000E+00 | 9.96814E−04 | −6.45312E−05 | 2.32484E−05 | −5.78960E−07 |
| 16 | 0.00000E+00 | −2.22915E−05 | 1.96390E−05 | −4.34006E−07 | −4.17676E−08 |
| 17 | 0.00000E+00 | 2.83555E−04 | 5.62335E−06 | 6.67357E−08 | −5.27455E−08 |

TABLE 4

Conditional expression numerical value

| (1) | vd 11 − vd 12 | 37.420 |
|---|---|---|
| (2) | f1/IH | 9.231 |
| (3) | f1/√(fw · ft) | 2.739 |
| (4) | |f2/fw| | 1.278 |
| (5) | vd2 n − vd2 p | 22.135 |
| (6) | ndp | 1.907 |
| (7) | {(vd 21 + vd 22)/2} − vd 23 | 22.135 |
| (8) | nd23 | 1.907 |
| (9) | |ΔWM2|/IH | 1.002 |

TABLE 4-continued

Conditional expression numerical value

| (10) | |ΔWT2|/IH | 0.263 |
|---|---|---|
| (11) | vd3 p − vd3 n | 50.290 |
| (12) | f3/f4 | 0.423 |
| (13) | R11/IH | 4.646 |
| (14) | (IH × 100)/|R12| | 0.180 |
| (15) | IH/R13 | 0.041 |

Working Example 2

Figure 8:
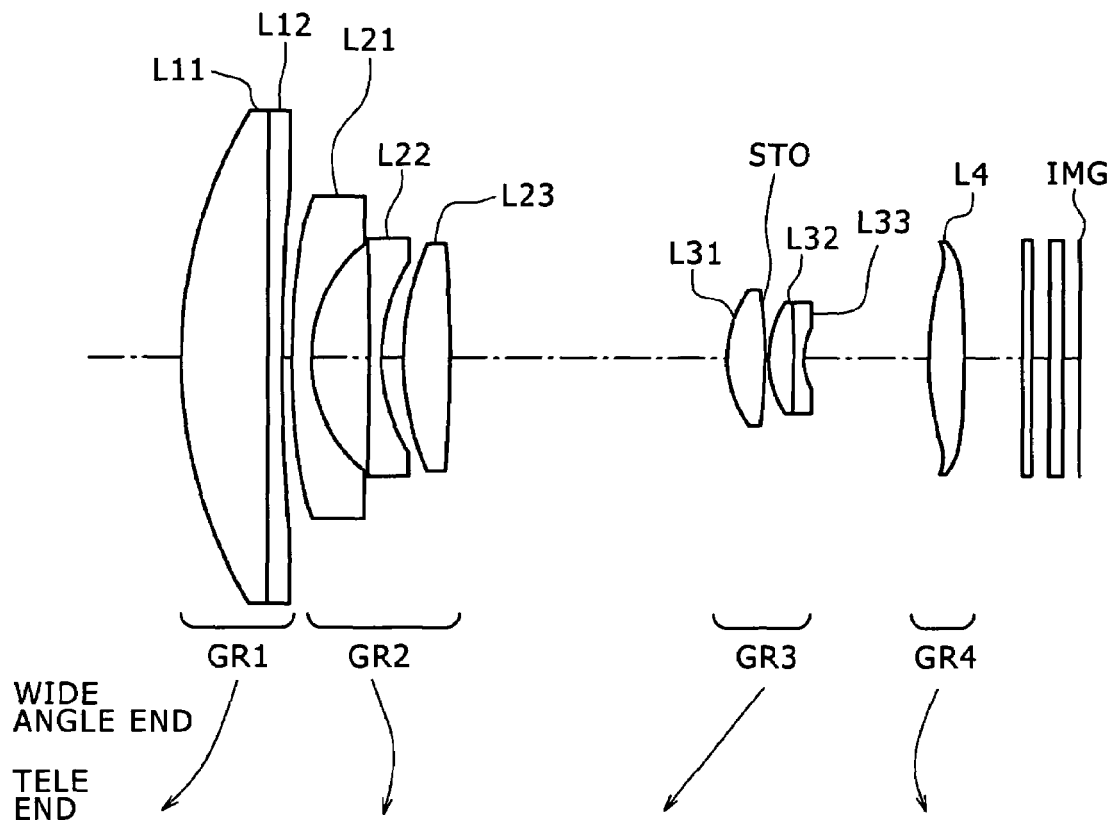
FIG. 8 is a sectional view of a zoom lens according to a second working example of the present invention.

FIG. 8 shows a configuration of a zoom lens according to the working example 2. Referring to FIG. 8, the zoom lens includes a first lens group GR1 having a positive refracting power, a second lens group GR2 having a negative refracting power, a third lens group GR3 having a positive refracting power, and a fourth lens group GR4 having a positive refracting power, disposed in order from the object side. In the zoom lens, upon zooming from the wide-angle end to the telephoto end, the first lens group GR1 moves so as to increase the distance to the second lens group GR2, and the second lens group GR2 moves to the image side once and then moves so as to return to the object side. Further, the third lens group GR3 moves to the object side.

The first lens group GR1 is composed only of a cemented lens including a positive lens L11 and a negative lens L12 cemented in order from the object side and generally has a positive refracting power. The second lens group GR2 is composed of a negative lens L21, another negative lens L22 and a positive lens L23 disposed in order from the object side and generally has a negative refracting power. The third lens group GR3 is composed of a positive lens L31, an aperture stop STO, another positive lens L32 and a negative lens L33 disposed in order from the object side and generally has a positive refracting power. The fourth lens group GR4 is composed of a positive lens L4 and generally has a positive refracting power.

Figure 9:
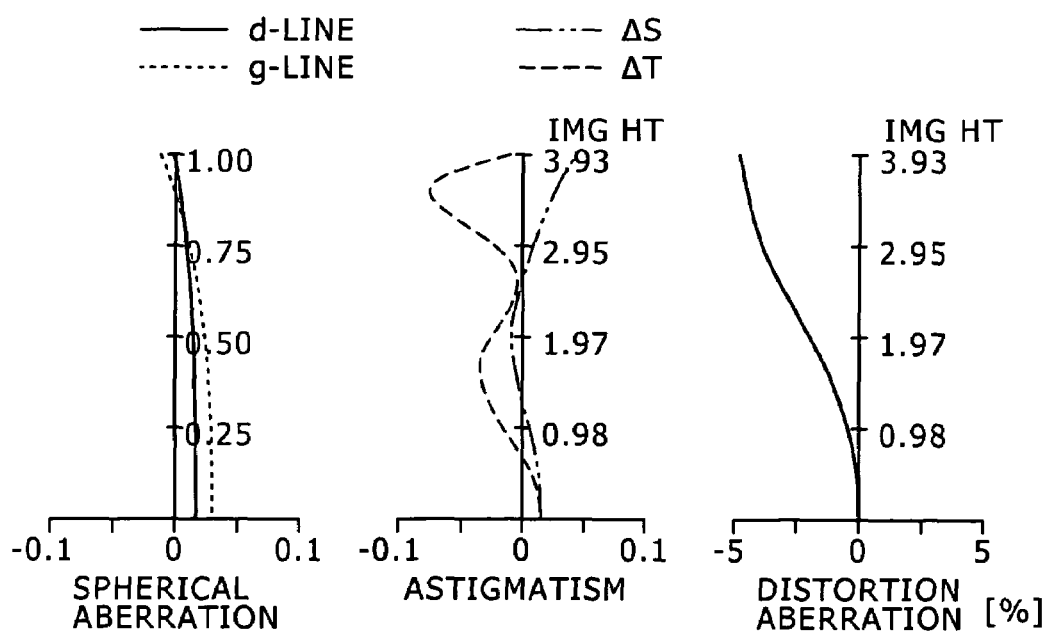
FIG. 9 is a diagrammatic view illustrating longitudinal aberrations at the wide-angle end of the zoom lens of FIG. 8.
Figure 11:
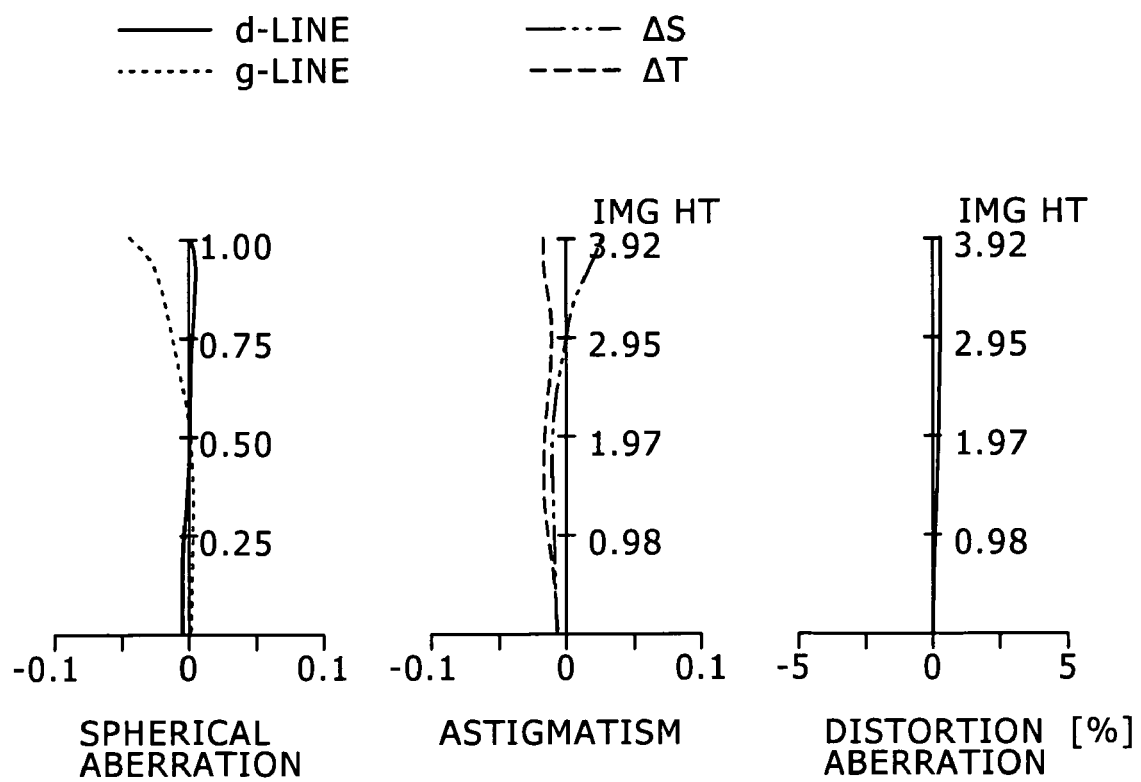
FIG. 11 is a diagrammatic view illustrating longitudinal aberrations at an intermediate focus position of the zoom lens of FIG. 8.
Figure 13:
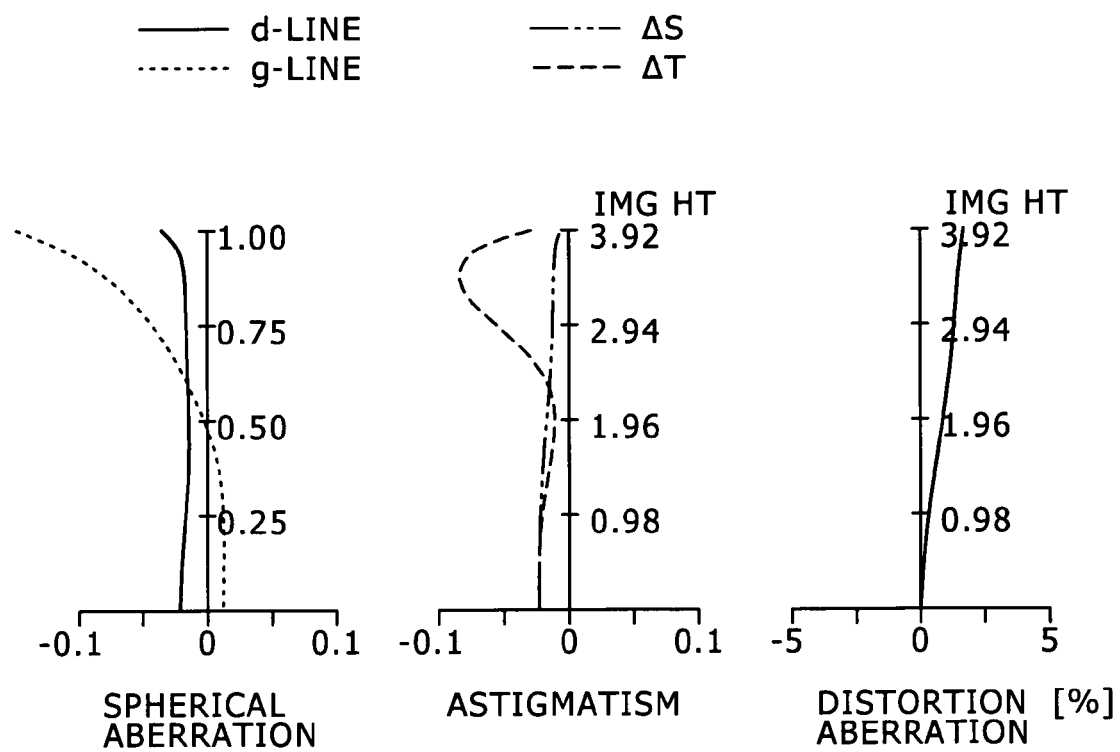
FIG. 13 is a diagrammatic view illustrating longitudinal aberrations at the telephoto end of the zoom lens of FIG. 8.
Figure 14:
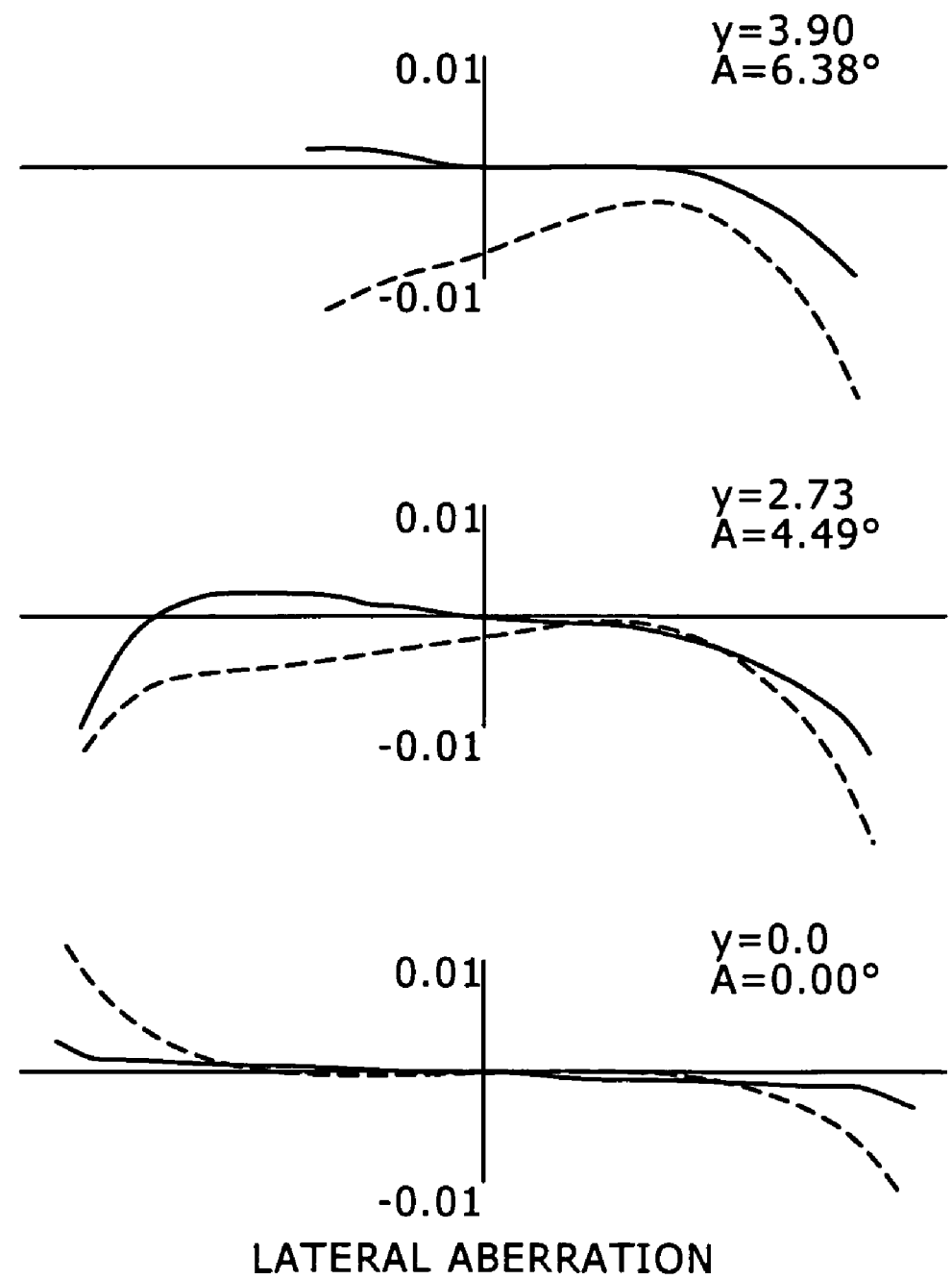
FIG. 14 is a diagrammatic view illustrating lateral aberrations at the telephoto end of the zoom lens of FIG. 8.

FIG. 9 illustrates longitudinal aberrations at the wide-angle end of the zoom lens of the working example 2. FIG. 10 illustrates lateral aberrations at the wide-angle end of the zoom lens of the working example 2. FIG. 11 illustrates the longitudinal aberrations at an intermediate focal position of the zoom lens of the working example 2. FIG. 12 illustrates the lateral aberrations at the intermediate focal position of the zoom lens of the working example 2. FIG. 13 illustrates the longitudinal aberrations at the telephoto end of the zoom lens of the working example 2. FIG. 14 illustrates the lateral aberrations at the telephoto end of the zoom lens of the working example 2.

Data of the optical system in the working example 2 are indicated in Table 5; variation distances upon power variation of the working example 2 are indicated in Table 6; aspheric constants of the aspheric faces in the working example 2 are indicated in Table 7; and conditional expression numerical values in the working example 2 are indicated in Table 8.

TABLE 5

| si | ri | di | ni | vi |
|---|---|---|---|---|
| \multicolumn{5}{c}{f = 5.20~34.29 FNo = 3.25~5.41 ω = 38.52~6.43} | | | | |
| 1 (ASP) | 18.883 | 3.340 | 1.76802 | 49.240 |
| 2 | −2949.099 | 0.500 | 1.94595 | 17.980 |
| 3 | 71.254 | (d 3) | | |
| 4 (ASP) | 299.101 | 0.720 | 1.85135 | 40.100 |
| 5 (ASP) | 6.964 | 2.270 | | |
| 6 | −169.906 | 0.500 | 1.81600 | 46.570 |
| 7 | 6.873 | 0.800 | | |
| 8 (ASP) | 9.440 | 1.734 | 1.90680 | 21.200 |
| 9 (ASP) | 69.442 | (d 9) | | |
| 10 (ASP) | 4.505 | 1.420 | 1.69350 | 53.200 |
| 11 (ASP) | −14.302 | 0.000 | | |
| STO | INFINITY | 0.150 | | |
| 13 | 3.969 | 1.000 | 1.49700 | 81.610 |
| 14 | −55.589 | 0.350 | 1.90366 | 31.320 |
| 15 | 2.960 | (d 15) | | |
| 16 (ASP) | 13.585 | 1.205 | 1.52470 | 56.460 |
| 17 (ASP) | −46.662 | (d 17) | | |

TABLE 5-continued

| si | ri | di | ni | vi |
|---|---|---|---|---|
| \multicolumn{5}{c}{f = 5.20~34.29 FNo = 3.25~5.41 ω = 38.52~6.43} | | | | |
| 18 | INFINITY | 0.300 | 1.51680 | 64.200 |
| 19 | INFINITY | 0.750 | | |
| 20 | INFINITY | 0.500 | 1.55671 | 58.562 |
| 21 | INFINITY | 0.600 | | |
| IMG | INFINITY | | | |

TABLE 6

| | Variation distance | | |
|---|---|---|---|
| f | 5.20 | 13.36 | 34.29 |
| d 3 | 0.350 | 8.000 | 16.026 |
| d 9 | 10.664 | 3.291 | 0.350 |
| d 15 | 4.862 | 4.522 | 11.685 |
| d 17 | 2.221 | 6.150 | 4.500 |

TABLE 7

| | | Aspheric coefficient | | | |
|---|---|---|---|---|---|
| si | K | A | B | C | D |
| 1 | 0.00000E+00 | −1.43402E−06 | −2.79024E−08 | 3.40690E−10 | −2.18023E−12 |
| 4 | 0.00000E+00 | 1.06611E−03 | −1.96863E−05 | 1.36364E−07 | −5.86011E−10 |
| 5 | 0.00000E+00 | 9.80014E−04 | 4.83591E−05 | −4.02096E−08 | −7.35445E−09 |
| 8 | 0.00000E+00 | −7.66752E−04 | 6.16852E−05 | −7.04224E−06 | 2.91214E−07 |
| 9 | 0.00000E+00 | −7.42151E−04 | 3.23451E−05 | −4.81031E−06 | 2.21369E−07 |
| 10 | 0.00000E+00 | −7.29532E−04 | −4.14670E−05 | 5.74580E−06 | 7.87515E−07 |
| 11 | 0.00000E+00 | 9.98841E−04 | −6.64244E−05 | 2.31226E−05 | −7.26052E−07 |
| 16 | 0.00000E+00 | −1.62061E−04 | −2.22401E−06 | −3.84055E−07 | −7.72845E−08 |
| 17 | 0.00000E+00 | 8.02270E−05 | −1.86767E−05 | 4.72744E−09 | −7.23224E−08 |

TABLE 8

| | Conditional expression numerical value | |
|---|---|---|
| (1) | vd 11 − vd 12 | 31.260 |
| (2) | f1/IH | 8.920 |
| (3) | f1/√(fw · ft) | 2.624 |
| (4) | |f2/fw| | 1.240 |
| (5) | vd2 n − vd2 p | 22.135 |
| (6) | ndp | 1.907 |
| (7) | {(vd 21 + vd 22)/2} − vd 23 | 22.135 |
| (8) | nd23 | 1.907 |
| (9) | |ΔWM2|/IH | 0.963 |
| (10) | |ΔWT2|/IH | 0.308 |
| (11) | vd3 p − vd3 n | 50.290 |
| (12) | f3/f4 | 0.421 |
| (13) | R11/IH | 4.807 |
| (14) | (IH × 100)/|R12| | 0.133 |
| (15) | IH/R13 | 0.055 |

Working Example 3

Figure 15:
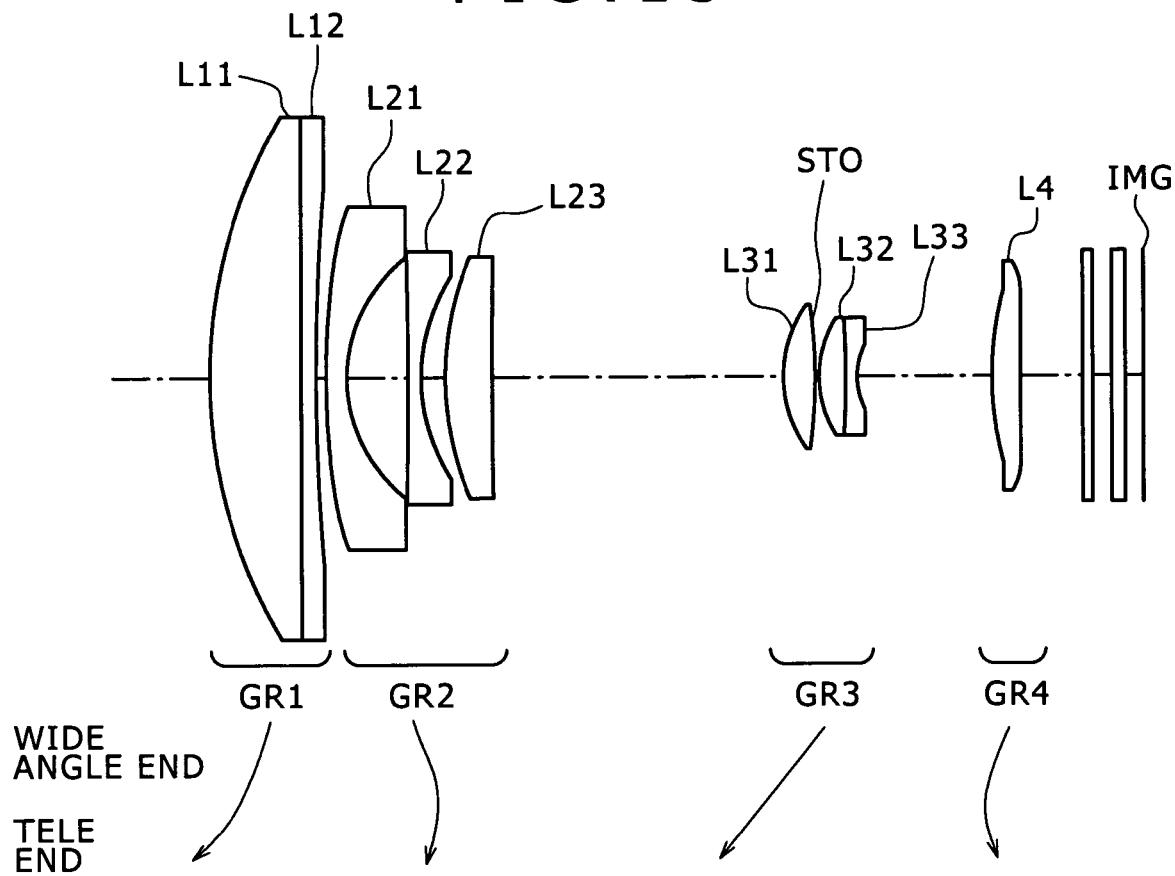
FIG. 15 is a sectional view of a zoom lens according to a third working example of the present invention.

FIG. 15 shows a configuration of a zoom lens according to the working example 3. Referring to FIG. 15, the zoom lens includes a first lens group GR1 having a positive refracting power, a second lens group GR2 having a negative refracting power, a third lens group GR3 having a positive refracting power, and a fourth lens group GR4 having a positive refracting power, disposed in order from the object side. In the zoom lens, upon zooming from the wide-angle end to the telephoto end, the first lens group GR1 moves so as to increase the distance to the second lens group GR2, and the second lens group GR2 moves to the image side once and then moves so as to return to the object side. Further, the third lens group GR3 moves to the object side.

The first lens group GR1 is composed only of a cemented lens including a positive lens L11 and a negative lens L12 cemented in order from the object side and generally has a positive refracting power. The second lens group GR2 is composed of a negative lens L21, another negative lens L22 and a positive lens L23 disposed in order from the object side and generally has a negative refracting power. The third lens group GR3 is composed of a positive lens L31, an aperture stop STO, another positive lens L32 and a negative lens L33 disposed in order from the object side and generally has a positive refracting power. The fourth lens group GR4 is composed of a positive lens L4 and generally has a positive refracting power.

Figure 16:
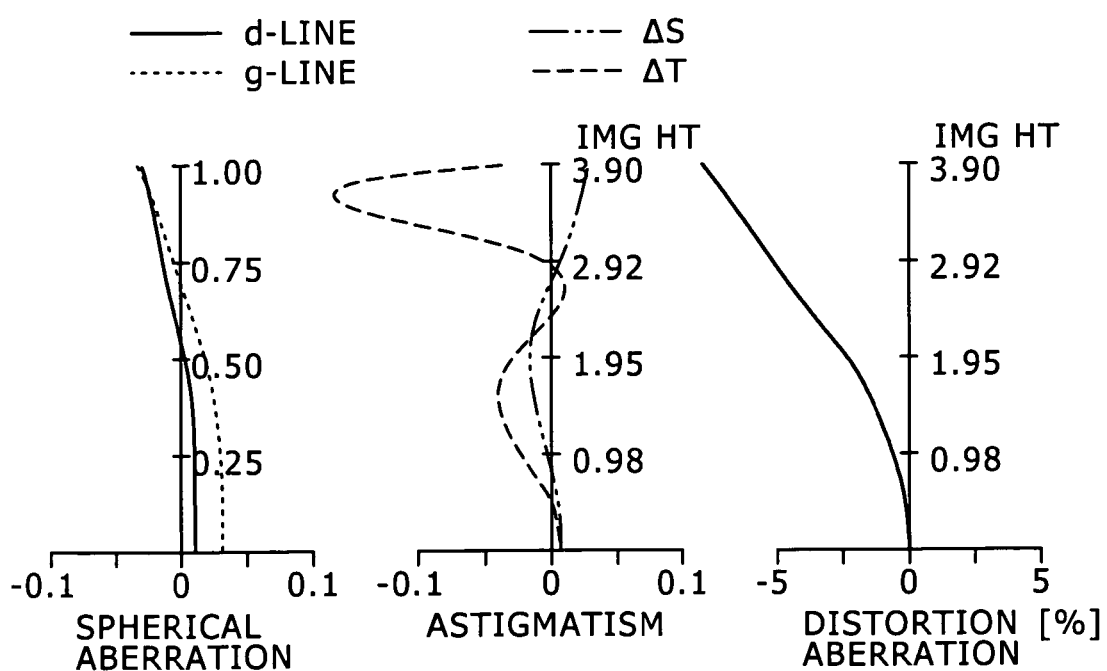
FIG. 16 is a diagrammatic view illustrating longitudinal aberrations at the wide-angle end of the zoom lens of FIG. 15.
Figure 18:
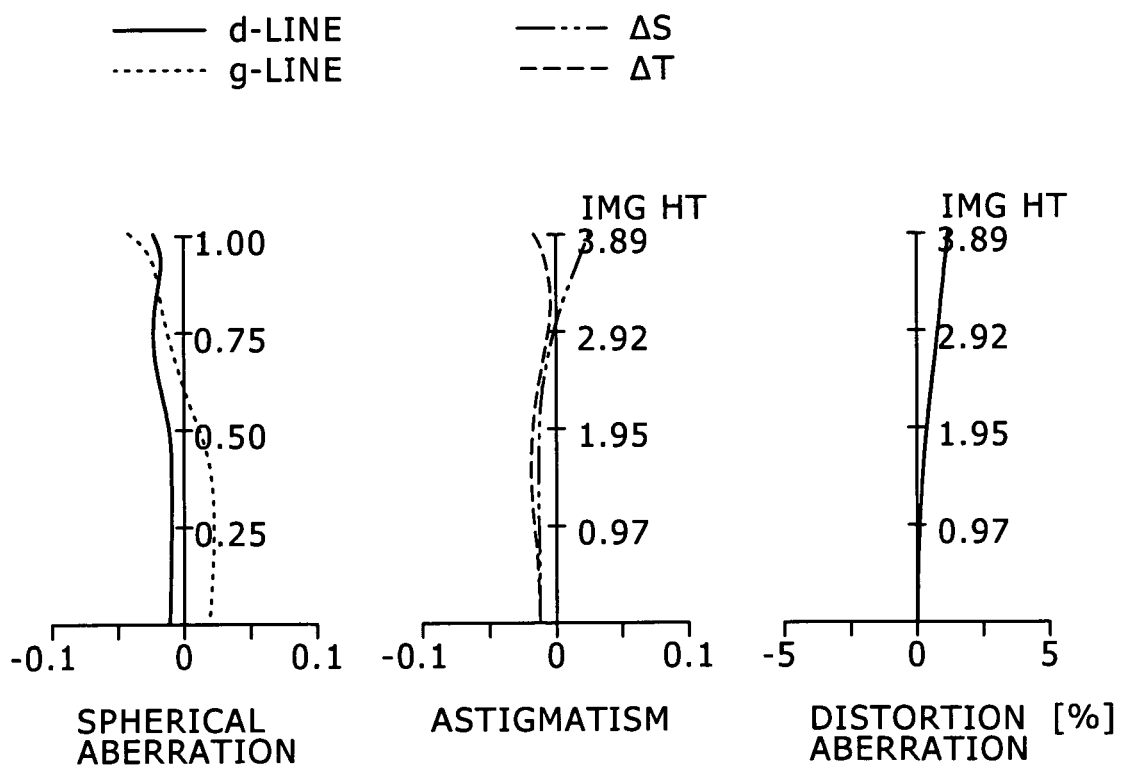
FIG. 18 is a diagrammatic view illustrating longitudinal aberrations at an intermediate focus position of the zoom lens of FIG. 15.
Figure 20:
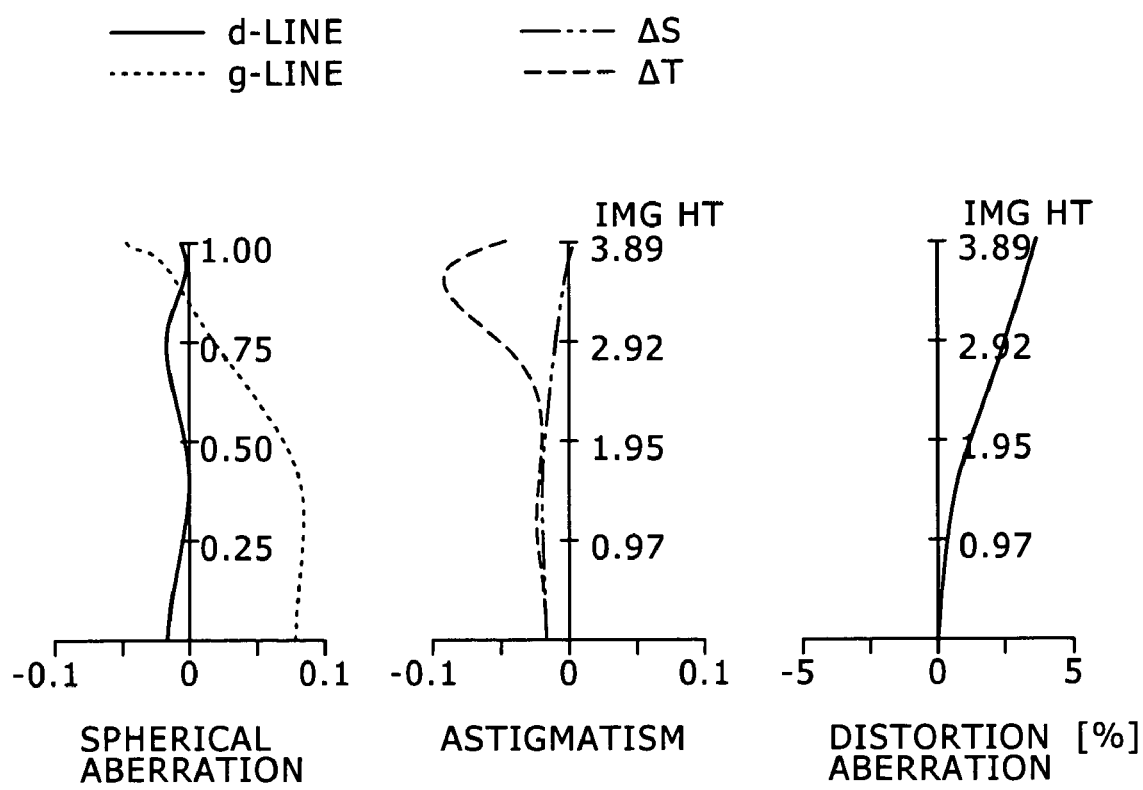
FIG. 20 is a diagrammatic view illustrating longitudinal aberrations at the telephoto end of the zoom lens of FIG. 15.

FIG. 16 illustrates longitudinal aberrations at the wide-angle end of the zoom lens of the working example 3. FIG. 17 illustrates lateral aberrations at the wide-angle end of the zoom lens of the working example 3. FIG. 18 illustrates the longitudinal aberrations at an intermediate focal position of the zoom lens of the working example 3. FIG. 19 illustrates the lateral aberrations at the intermediate focal position of the zoom lens of the working example 3. FIG. 20 illustrates the longitudinal aberrations at the telephoto end of the zoom lens of the working example 3. FIG. 21 illustrates the lateral aberrations at the telephoto end of the zoom lens of the working example 3.

Data of the optical system in the working example 3 are indicated in Table 9; variation distances upon power variation of the working example 3 are indicated in Table 10; aspheric constants of the aspheric faces in the working example 3 are indicated in Table 11; and conditional expression numerical values in the working example 3 are indicated in Table 12.

TABLE 9

| | f = 5.20~34.29 FNo = 3.28~5.40 ω = 39.40~6.30 | | | |
|---|---|---|---|---|
| si | ri | di | ni | vi |
| 1 (ASP) | 19.881 | 3.320 | 1.76802 | 49.240 |
| 2 | −354.865 | 0.500 | 1.94595 | 17.980 |
| 3 | 84.954 | (d 3) | | |
| 4 (ASP) | 140.596 | 0.720 | 1.79626 | 45.484 |
| 5 (ASP) | 6.595 | 2.270 | | |
| 6 | −2546.541 | 0.500 | 1.83939 | 44.271 |
| 7 | 7.045 | 0.800 | | |
| 8 (ASP) | 9.437 | 1.710 | 1.90680 | 21.200 |
| 9 (ASP) | 50.849 | (d 9) | | |
| 10 (ASP) | 4.561 | 1.159 | 1.69350 | 53.200 |
| 11 (ASP) | −14.480 | 0.000 | | |
| STO | INFINITY | 0.150 | | |
| 13 | 3.906 | 1.000 | 1.49700 | 81.610 |
| 14 | −257.594 | 0.350 | 1.90366 | 31.320 |
| 15 | 2.960 | (d 15) | | |
| 16 (ASP) | 12.760 | 1.049 | 1.52470 | 56.460 |
| 17 (ASP) | −124.935 | (d 17) | | |
| 18 | INFINITY | 0.300 | 1.51680 | 64.200 |
| 19 | INFINITY | 0.750 | | |
| 20 | INFINITY | 0.500 | 1.55671 | 58.562 |
| 21 | INFINITY | 0.600 | | |
| IMG | INFINITY | | | |

TABLE 10

| | Variation distance | | |
|---|---|---|---|
| f | 5.20 | 13.35 | 34.29 |
| d 3 | 0.350 | 8.000 | 16.521 |
| d 9 | 10.720 | 3.354 | 0.350 |
| d 15 | 4.925 | 4.600 | 11.252 |
| d 17 | 2.315 | 6.252 | 4.500 |

TABLE 11

| | Aspheric coefficient | | | | |
|---|---|---|---|---|---|
| si | K | A | B | C | D |
| 1 | 0.00000E+00 | −1.04330E−06 | −1.03875E−08 | 7.69751E−11 | −6.05181E−13 |
| 4 | 0.00000E+00 | 1.10864E−03 | −4.01616E−05 | 7.96337E−07 | −7.48167E−09 |
| 5 | 0.00000E+00 | 1.19199E−03 | 2.35967E−05 | −7.65382E−07 | 3.07377E−09 |
| 8 | 0.00000E+00 | −6.23661E−04 | 5.26022E−05 | −6.99579E−06 | 2.99830E−07 |
| 9 | 0.00000E+00 | −6.68096E−04 | 2.65686E−05 | −4.36606E−06 | 2.18083E−07 |
| 10 | 0.00000E+00 | −7.35933E−04 | −4.16242E−05 | −5.07637E−08 | 1.64044E−06 |
| 11 | 0.00000E+00 | 9.22728E−04 | −9.45884E−05 | 2.42176E−05 | −6.04859E−07 |
| 16 | 0.00000E+00 | 3.87626E−04 | −2.58867E−05 | −1.29009E−06 | −7.08422E−08 |
| 17 | 0.00000E+00 | 7.43144E−04 | −1.91155E−05 | −3.47335E−06 | 1.73649E−08 |

TABLE 12

| | Conditional expression | numerical value |
|---|---|---|
| (1) | vd 11 − vd 12 | 31.260 |
| (2) | f1/IH | 9.098 |
| (3) | f1/√(fw · ft) | 2.676 |
| (4) | |f2/fw| | 1.255 |
| (5) | vd2 n − vd2 p | 23.677 |
| (6) | ndp | 1.907 |
| (7) | {(vd 21 + vd 22)/2} − vd 23 | 23.677 |
| (8) | nd23 | 1.907 |
| (9) | |ΔWM2|/IH | 0.956 |
| (10) | |ΔWT2|/IH | 0.473 |
| (11) | vd3 p − vd3 n | 50.290 |
| (12) | f3/f4 | 0.382 |
| (13) | R11/IH | 5.061 |
| (14) | (IH × 100)/|R12| | 1.107 |
| (15) | IH/R13 | 0.046 |

Working Example 4

Figure 22:
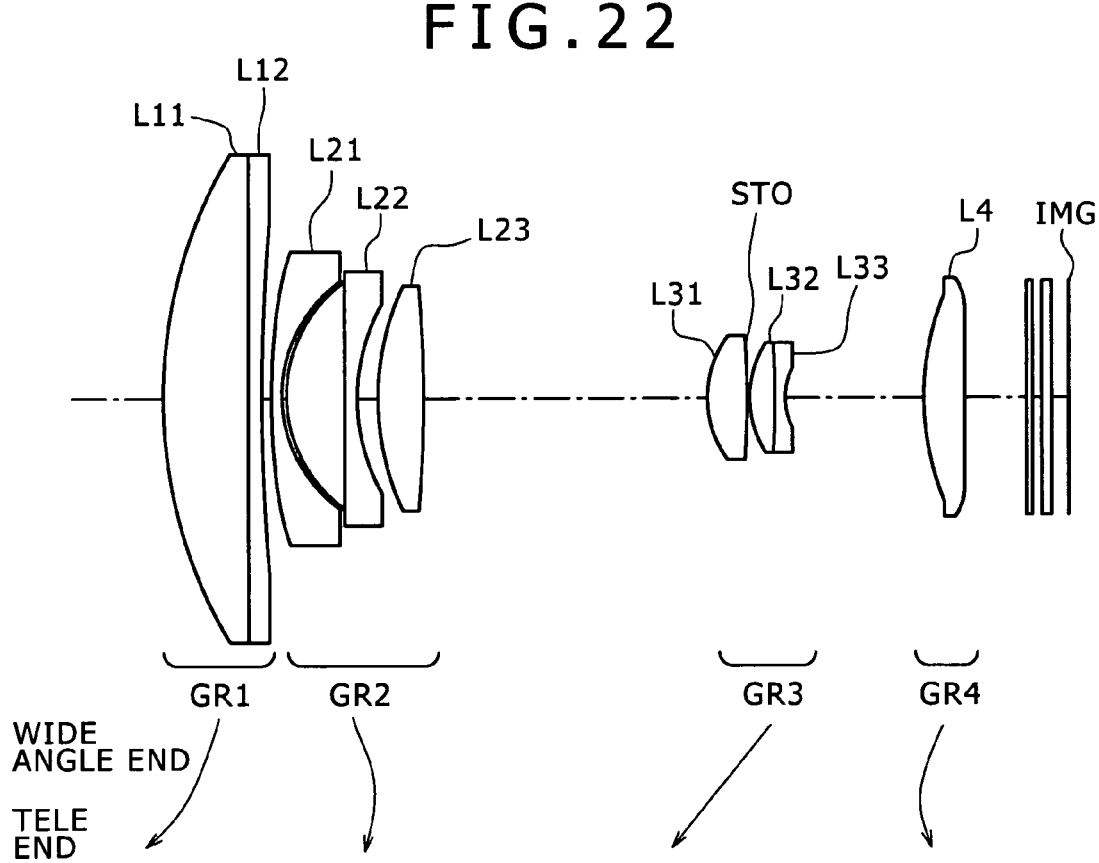
FIG. 22 is a sectional view of a zoom lens according to a fourth working example of the present invention.

FIG. 22 shows a configuration of a zoom lens according to the working example 4. Referring to FIG. 22, the zoom lens includes a first lens group GR1 having a positive refracting power, a second lens group GR2 having a negative refracting power, a third lens group GR3 having a positive refracting power, and a fourth lens group GR4 having a positive refracting power, disposed in order from the object side. In the zoom lens, upon zooming from the wide-angle end to the telephoto end, the first lens group GR1 moves so as to increase the distance to the second lens group GR2, and the second lens group GR2 moves to the image side once and then moves so as to return to the object side. Further, the third lens group GR3 moves to the object side.

The first lens group GR1 is composed only of a cemented lens including a positive lens L11 and a negative lens L12 cemented in order from the object side and generally has a positive refracting power. The second lens group GR2 is composed of a negative lens L21, another negative lens L22 and a positive lens L23 disposed in order from the object side and generally has a negative refracting power. The third lens group GR3 is composed of a positive lens L31, an aperture stop STO, another positive lens L32 and a negative lens L33 disposed in order from the object side and generally has a positive refracting power. The fourth lens group GR4 is composed of a positive lens L4 and generally has a positive refracting power.

Figure 23:
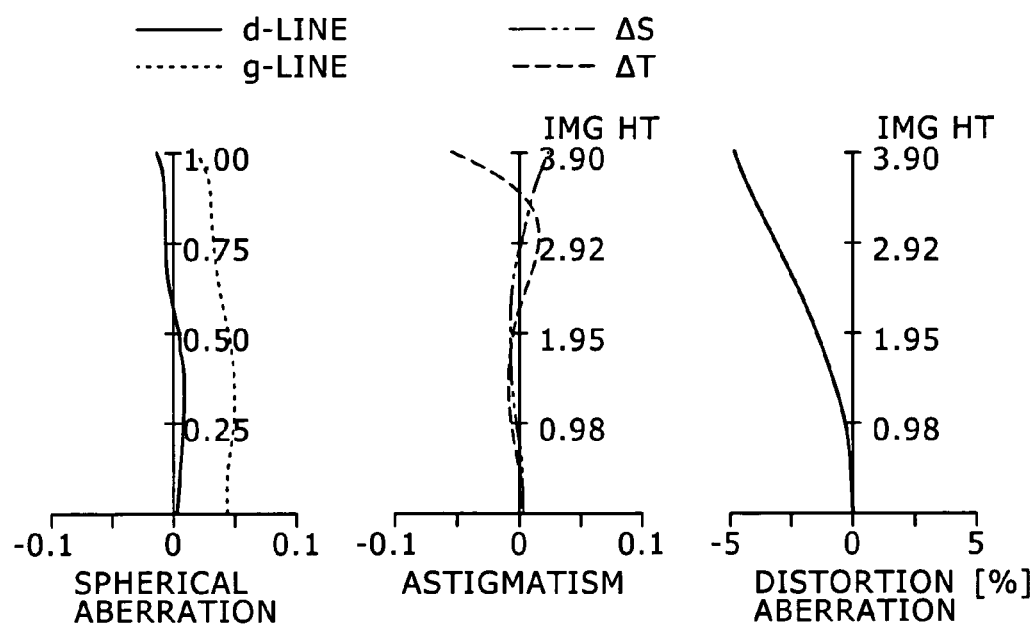
FIG. 23 is a diagrammatic view illustrating longitudinal aberrations at the wide-angle end of the zoom lens of FIG. 22.
Figure 25:
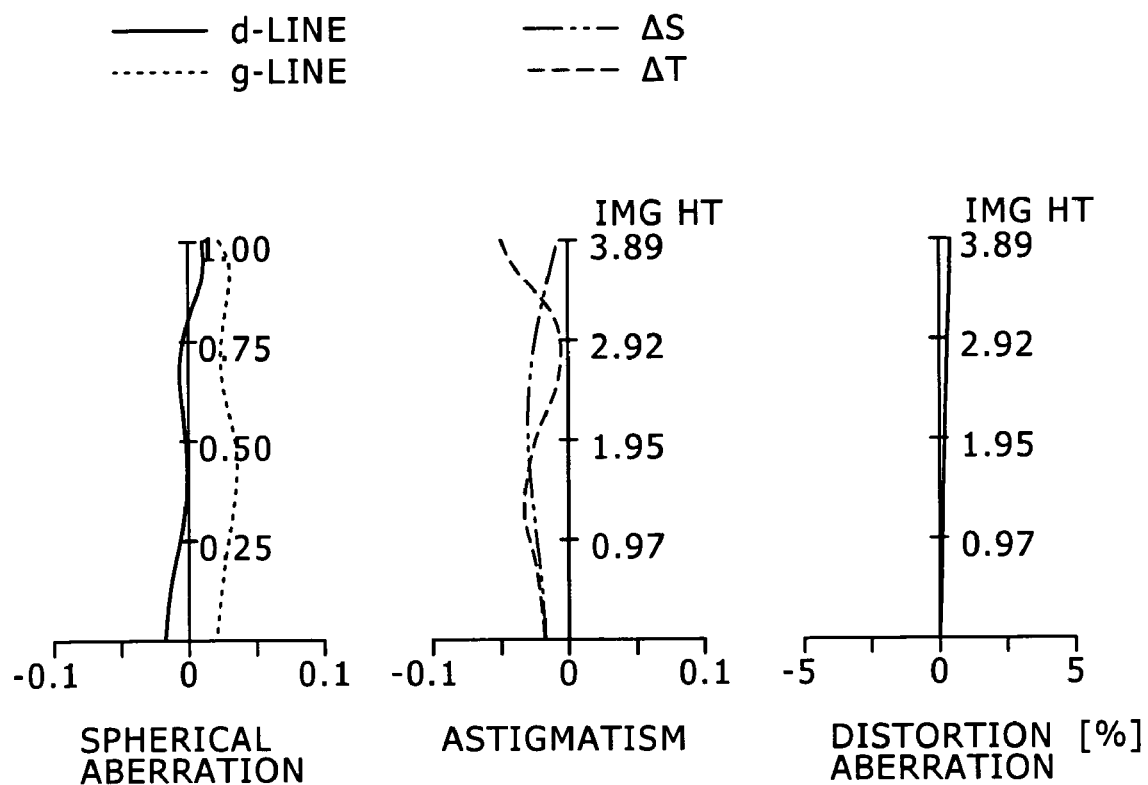
FIG. 25 is a diagrammatic view illustrating longitudinal aberrations at an intermediate focus position of the zoom lens of FIG. 22.
Figure 27:
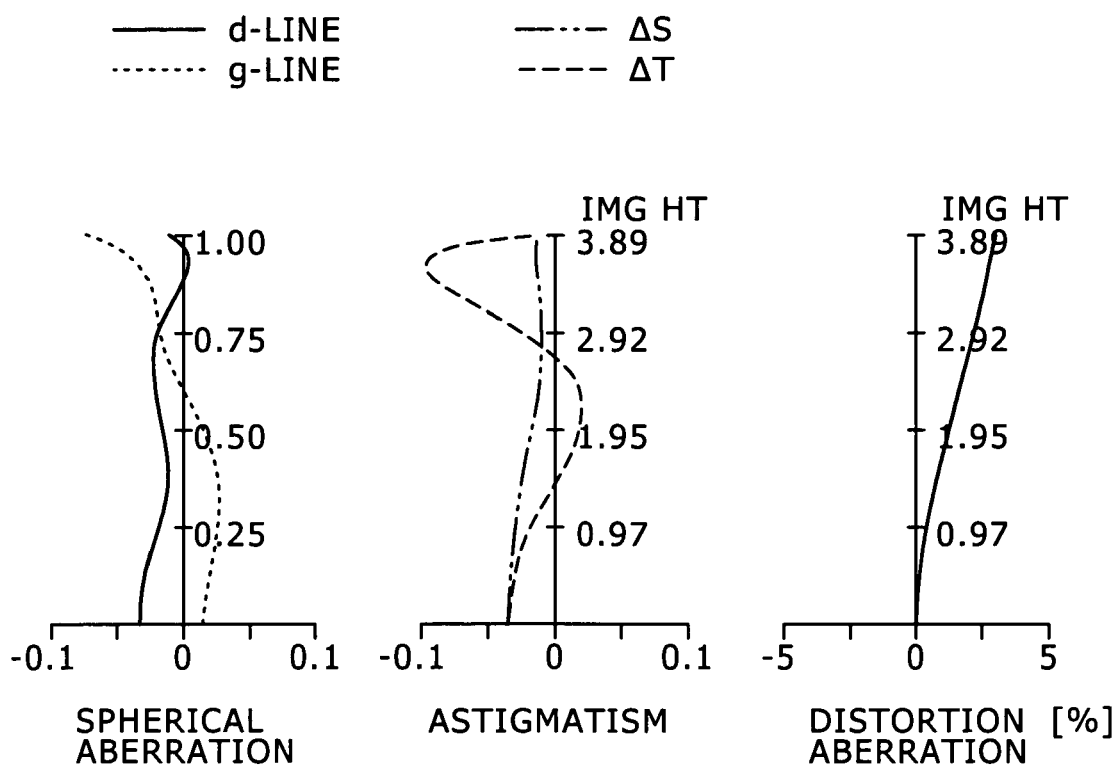
FIG. 27 is a diagrammatic view illustrating longitudinal aberrations at the telephoto end of the zoom lens of FIG. 22.

FIG. 23 illustrates longitudinal aberrations at the wide-angle end of the zoom lens of the working example 4. FIG. 24 illustrates lateral aberrations at the wide-angle end of the zoom lens of the working example 4. FIG. 25 illustrates the longitudinal aberrations at an intermediate focal position of the zoom lens of the working example 4. FIG. 26 illustrates the lateral aberrations at the intermediate focal position of the zoom lens of the working example 4. FIG. 27 illustrates the longitudinal aberrations at the telephoto end of the zoom lens of the working example 4. FIG. 28 illustrates the lateral aberrations at the telephoto end of the zoom lens of the working example 4.

Data of the optical system in the working example 4 are indicated in Table 13; variation distances upon power variation of the working example 4 are indicated in Table 14; aspheric constants of the aspheric faces in the working example 4 are indicated in Table 15; and conditional expression numerical values in the working example 4 are indicated in Table 16.

TABLE 13 f = 5.20~34.29 FNo = 3.34~5.54 ω = 38.49~6.35

| si | ri | di | ni | vi |
|---|---|---|---|---|
| 1 (ASP) | 19.019 | 3.350 | 1.61881 | 63.850 |
| 2 | −450.332 | 0.600 | 1.94595 | 17.980 |
| 3 | 190.473 | (d 3) | | |
| 4 | 30.388 | 0.500 | 1.88300 | 40.800 |
| 5 | 6.000 | 0.100 | 1.53420 | 41.734 |
| 6 (ASP) | 5.528 | 2.324 | | |
| 7 | −1.591E+05 | 0.500 | 1.88300 | 40.800 |
| 8 | 7.376 | 0.800 | | |
| 9 (ASP) | 10.135 | 1.814 | 1.90680 | 21.200 |
| 10 (ASP) | 397.968 | (d 10) | | |
| 11 (ASP) | 4.719 | 1.540 | 1.69350 | 53.200 |
| 12 (ASP) | −19.868 | 0.000 | | |
| STO | INFINITY | 0.150 | | |
| 14 | 3.717 | 1.030 | 1.49700 | 81.610 |
| 15 | −60.026 | 0.350 | 1.90366 | 31.320 |
| 16 | 3.019 | (d 16) | | |
| 17 (ASP) | 9.476 | 1.672 | 1.52470 | 56.460 |
| 18 (ASP) | −586.310 | (d 18) | | |
| 19 | INFINITY | 0.300 | 1.51680 | 64.200 |
| 20 | INFINITY | 0.400 | | |
| 21 | INFINITY | 0.500 | 1.55671 | 58.562 |
| 22 | INFINITY | 0.539 | | |
| IMG | INFINITY | | | |

TABLE 14

Variation distance

| f | 5.20 | 13.36 | 34.29 |
|---|---|---|---|
| d 3 | 0.350 | 8.716 | 17.002 |
| d 10 | 11.430 | 3.491 | 0.350 |
| d 16 | 5.582 | 5.745 | 13.483 |
| d 18 | 2.397 | 6.210 | 5.323 |

TABLE 15

Aspheric coefficient

| si | K | A | B | C | D |
|---|---|---|---|---|---|
| 1 | 0.00000E+00 | −1.72029E−06 | −5.03072E−08 | 7.01440E−10 | −4.83386E−12 |
| 6 | 0.00000E+00 | −2.58670E−04 | 1.37788E−05 | −2.60820E−06 | 9.58351E−08 |
| 9 | 0.00000E+00 | −3.38728E−04 | 1.91802E−05 | −4.39390E−06 | 1.88716E−07 |
| 10 | 0.00000E+00 | −4.41782E−04 | 1.63421E−05 | −3.85340E−06 | 1.56368E−07 |
| 11 | 0.00000E+00 | −2.28381E−04 | 9.60064E−05 | −1.80119E−05 | 3.91231E−06 |
| 12 | 0.00000E+00 | 1.13360E−03 | 6.96076E−05 | −3.23757E−06 | 3.65245E−06 |
| 17 | 0.00000E+00 | −7.57352E−04 | 6.38650E−05 | −4.77646E−06 | 7.40568E−08 |
| 18 | 0.00000E+00 | −5.23695E−04 | 6.61104E−05 | −5.55643E−06 | 1.00473E−07 |

TABLE 16

| | Conditional expression | numerical value |
|---|---|---|
| (1) | vd 11 − vd 12 | 45.870 |
| (2) | f1/IH | 9.319 |
| (3) | f1/√(fw · ft) | 2.741 |
| (4) | |f2/fw| | 1.297 |
| (5) | vd2 n − vd2 p | 19.600 |
| (6) | ndp | 1.907 |
| (7) | {(vd 21 + vd 22)/2} − vd 23 | 19.600 |
| (8) | nd23 | 1.907 |
| (9) | |ΔWM2|/IH | 1.009 |
| (10) | |ΔWT2|/IH | 0.065 |
| (11) | vd3 p − vd3 n | 50.290 |
| (12) | f3/f4 | 0.518 |
| (13) | R11/IH | 4.841 |
| (14) | (IH × 100)/|R12| | 0.872 |
| (15) | IH/R13 | 0.021 |

It can be recognized that the zoom lenses of the numerical value working examples 1 to 4 satisfy the conditional expressions (1) to (15) and, as seen from the diagrammatic views illustrating the aberrations of the zoom lenses, the aberrations are corrected in a well-balanced state at the wide-angle end position, at the intermediate focal position between the wide-angle end and the telephoto end and at the telephoto end position.

<Image Pickup Apparatus: Digital Still Camera>

Figure 29:
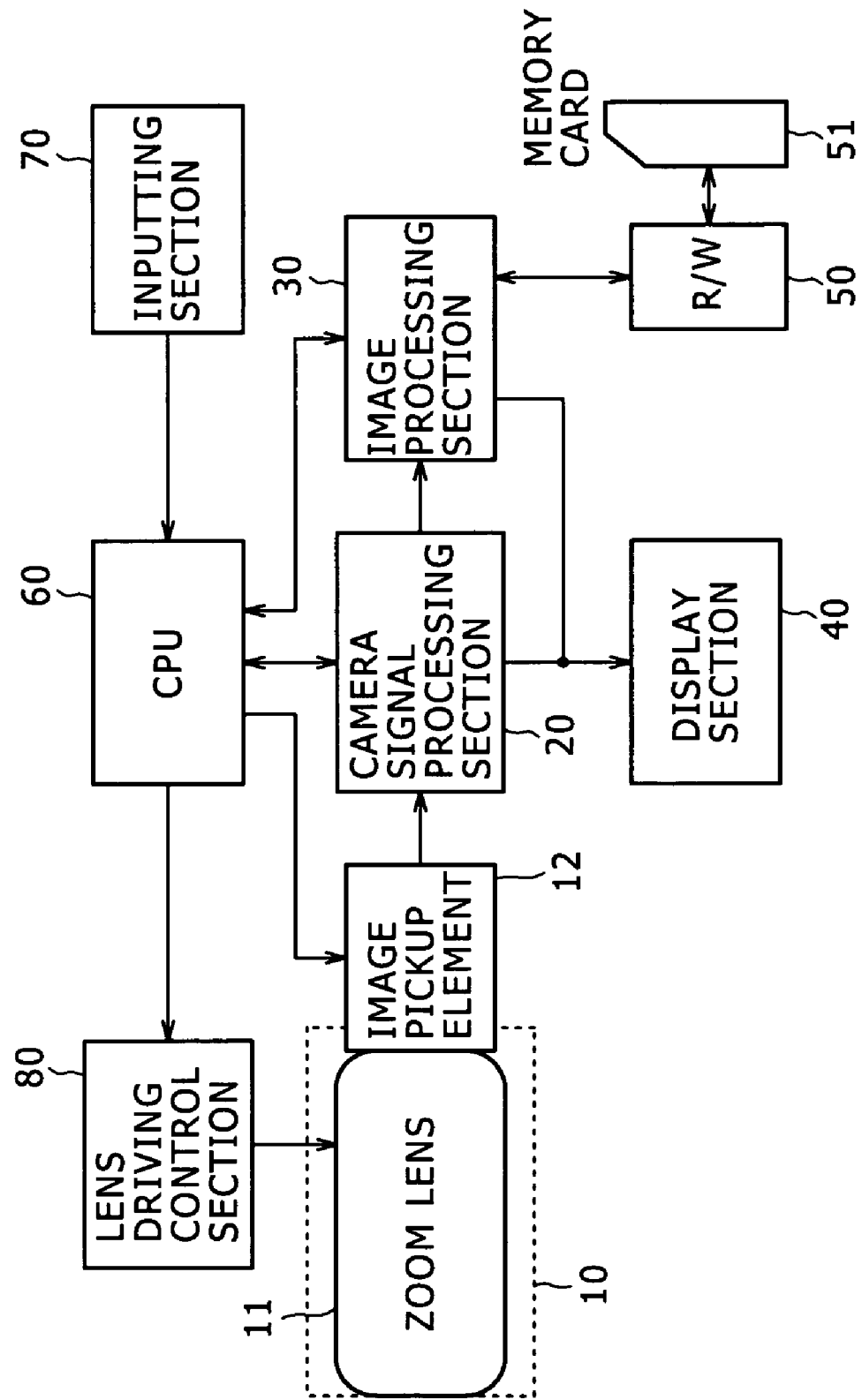
FIG. 29 is a block diagram showing an image pickup apparatus to which an embodiment of the present invention is applied.

Now, an image pickup apparatus according to an embodiment of the present invention in which a zoom lens is incorporated is described. FIG. 29 shows an example of a configuration of an image pickup apparatus in the form of a digital still camera to which the zoom lens of the embodiment of the present invention described above is applied.

Referring to FIG. 29, the digital still camera 100 shown includes a camera block 10 having an image pickup function, a camera signal processing section 20 for carrying out signal processing such as analog-digital conversion of an image signal of an image picked up by the camera block 10, and an image processing section 30 for carrying out recording and reproduction processes of an image signal. The digital still camera 100 further includes a display section 40 such as an LCD (Liquid Crystal Display) unit or an organic EL (Electro Luminescence) display unit for displaying an image picked up by the camera block 10 and so forth, and a reader/writer (R/W) 50 for carrying out writing into/reading out from a memory card 51. The digital still camera 100 further includes a central processing unit (CPU) 60 for controlling the entire digital still camera 100, an inputting section 70 operable by a user for inputting an operation signal, and a lens driving control section 80 for controlling driving of a lens system in the camera block 10.

The camera block 10 includes an optical system including a zoom lens 11 to which the embodiment of the present invention is applied, an image pickup element 12 such as a CCD (Charge Coupled Device) element or a CMOS (Complementary Metal Oxide Semiconductor) element, and so forth. The camera signal processing section 20 carries out signal processing such as conversion of an output signal from the image pickup element 12 into a digital signal, noise reduction, picture quality correction and conversion into luminance and color difference signals. The image processing section 30 carries out compression coding and decompression decoding processes of an image signal based on a predetermined image data format, a conversion process of data specifications such as a resolution and so forth.

The memory card 51 includes a removable semiconductor memory. The reader/writer 50 writes image data encoded by the image processing section 30 into the memory card 51 and reads out image data recorded in the memory card 51. The CPU 60 is a controlling processing section for controlling the circuit blocks in the digital still camera and controls the circuit blocks based on an instruction input signal from the inputting section 70 and so forth.

The inputting section 70 includes, for example, a shutter release button for carrying out a shutter operation, a selection switch for selecting an operation mode and other necessary buttons and switches and outputs an instruction input signal in response to an operation carried out by the user to the CPU 60. The lens driving control section 80 controls a motor not shown for driving the lenses in the zoom lens 11 and so forth based on a control signal from the CPU 60.

Operation of the digital still camera 100 is described briefly. In a waiting state for image pickup, an image signal picked up by the camera block 10 is outputted to the display section 40 through the camera signal processing section 20 and displayed on the display section 40 based on a camera-through signal under the control of the CPU 60.

If an instruction input signal for zooming is inputted from the inputting section 70, then the CPU 60 outputs a control signal to the lens driving control section 80. Consequently, a predetermined lens or lenses in the zoom lens 11 are moved under the control of the lens driving control section 80.

Then, if a shutter not shown of the camera block 10 is released in response to an instruction input signal from the inputting section 70, then the picked up image signal is outputted from the camera signal processing section 20 to the image processing section 30 and subjected to a compression coding process by the image processing section 30 so that it is converted into digital data of the predetermined data format. The converted data is outputted to the reader/writer 50 and written into the memory card 51.

It is to be noted that focusing is carried out such that, for example, when the shutter release button is half-depressed or is fully depressed for recording, the lens driving control section 80 moves a predetermined lens or lenses in the zoom lens 11 based on a control signal from the CPU 60.

On the other hand, when image data recorded on the memory card 51 is to be reproduced, predetermined image data is read out from the memory card 51 by the reader/writer 50 in response to an operation of the inputting section 70. Then, the image data is subjected to a decompression decoding process by the image processing section 30, and a resulting reproduction image signal is outputted to the display section 40. Consequently, a reproduction image is displayed on the display section 40.

It is to be noted that, while, in the embodiment of the present invention described above, the image pickup apparatus according to the embodiment of the present invention is applied to a digital still camera, also it is possible to apply the image pickup apparatus according to the embodiment of the present invention to other image pickup apparatus such as a video camera.

Further, the particular shapes, structures and numerical values of the components of the embodiment and numerical value examples of the present invention described above are mere examples in embodying the present invention and the technical scope of the present invention shall not be interpreted restrictively depending upon them.

The present application contains subject matter related to that disclosed in Japanese Priority Patent Application JP 2008-173096 filed in the Japan Patent Office on Jul. 2, 2008, the entire content of which is hereby incorporated by reference.

What is claimed is:

1. A zoom lens, comprising:
a first lens group having a positive refracting power;
a second lens group having a negative refracting power;
a third lens group having a positive refracting power; and
a fourth lens group having a positive refracting power;
said first, second, third and fourth lens groups being disposed in order from the object side;
upon zooming from the wide-angle end to the telephoto end, said first lens group moving so as to increase the distance to said second lens group, said second lens group moving to the image side once and then moving so as to return to the object side, and said third lens group moving to the object side;
said first lens group including only
a cemented lens including
a positive lens, and
a negative lens;
said positive lens and said negative lens being cemented in order from the object side;
said cemented lens having a generally positive refracting power;
said first lens group being configured so as to satisfy the following conditional expression (1):

$$25 < v_{d11} - v_{d12} < 50 \quad (1)$$

where $v_{d11}$ is the Abbe number of said positive lens of said first lens group and $v_{d12}$ is the Abbe number of said negative lens of said first lens group.

2. The zoom lens according to claim 1, wherein said positive lens which makes up said first lens group is formed from a biconvex lens.

3. The zoom lens according to claim 1, wherein said first lens group satisfies the following conditional expressions (2) and (3):

$$7.0 < f1/IH < 14 \quad (2)$$

$$2.2 < f1/\sqrt{(fw \cdot ft)} < 3.6 \quad (3)$$

where f1 is the focal distance of said first lens group, IH the maximum image height, fw the focal distance of the entire system at the wide-angle end and ft the focal distance of the entire system at the telephoto end.

4. The zoom lens according to claim 1, wherein the lens face of said first lens group which is positioned nearest to the image side has a concave shape to the image side.

5. The zoom lens according to claim 1, wherein said second lens group includes
a lens pair which includes
a negative lens, and
a positive lens,
said negative lens and said positive lens are disposed in order from the object side, and
said second lens group satisfies the following conditional expressions (4) to (6):

$$1.0 < |f2/fw| < 1.6 \quad (4)$$

$$15 < v_{d2}n - v_{d2}p < 35 \quad (5)$$

$$n_d P > 1.75 \quad (6)$$

where f2 is the focal distance of said second lens group, fw the focal distance of the entire system at the wide-angle end, $v_{d2}n$ an average value of the Abbe number of all negative lenses disposed in said second lens group, $v_{d2}p$ an average value of the Abbe number of all positive lenses disposed in said second lens group, and $n_d p$ an average value of the refractive index of all positive lenses disposed in said second lens group.

6. The zoom lens according to claim 1, wherein said second lens group has three lenses including negative, negative and positive power lenses disposed in order from the object side and satisfies the following conditional expressions (4), (7) and (8):

$$1.0 < |f2/fw| < 1.5 \quad (4)$$

$$15 < \{(v_{d21} + v_{d22})/2\} - v_{d23} < 30 \quad (7)$$

$$n_{d23} > 1.84 \quad (8)$$

where f2 is the focal distance of said second lens group, fw the focal distance of the entire system at the wide-angle end, $v_{d21}$ the Abbe number of the negative lens of said second lens group which is disposed nearest to the object side, $v_{d22}$ the Abbe number of the negative lens of said second lens group which is disposed second nearest to the object side, $v_{d23}$ the Abbe number of the positive lens of said second lens group which is disposed nearest to the image side, and $n_{d23}$ the refractive index of the positive lens of said second lens group which is positioned nearest to the image side.

7. The zoom lens according to claim 1, wherein said zoom lens satisfies the following conditional expressions (9) and (10) regarding movement of said second lens group upon zooming from the wide-angle end to the telephoto end:

$$0.7 < |\Delta WM2|/IH < 1.2 \quad (9)$$

$$|\Delta WT2|/IH < 0.7 \quad (10)$$

where $\Delta WM2$ is the distance from the position of said second lens group at the wide-angle end to the position of said second lens group at an intermediate focal position, $\Delta WT2$ the distance from the position of said second lens group at the wide-angle end to the position of said second lens group at the telephoto-end, and IH the maximum image height, the intermediate focal position being given by $fm=\sqrt{(fw \cdot ft)}$ where fm is the intermediate focal position, fw the focal distance of the entire system at the wide-angle end and ft the focal distance of the entire system at the telephoto end.

8. The zoom lens according to claim 1, wherein said third lens group includes at least one cemented lens formed from positive and negative lenses and made of glass materials which satisfy the following expression (11):

$$25 < v_{d3}p - v_{d3}n < 70 \quad (11)$$

where $v_{d3}p$ is the Abbe number of the positive lens which forms said third lens group and $v_{d3}n$ the Abbe number of the negative lens which forms said third lens group.

9. The zoom lens according to claim 1, wherein the focal distances of said third and fourth lens groups satisfy the following conditional expression (12):

$$0.25 < f3/f4 < 1.0 \quad (12)$$

where f3 is the focal distance of said third lens group and f4 the focal distance of said fourth lens group.

10. The zoom lens according to claim 1, wherein said fourth lens group is moved in a direction of an optical axis to carry out focusing.

11. The zoom lens according to claim 1, wherein said fourth lens group first moves to the object side once and then moves so as to return to the object side upon zooming from the wide-angle end to the telephoto end.

12. The zoom lens according to claim 1, wherein said third lens group moves in a direction perpendicular to an optical axis to carry out correction of image shake.

13. The zoom lens according to claim 1, wherein said fourth lens group is made up of a single positive lens formed by plastic molding.

14. The zoom lens according to claim 1, wherein an image is formed on a solid-state image pickup element through said first to fourth lens groups.

15. An image pickup apparatus, comprising:
   a zoom lens including
      a first lens group having a positive refracting power,
      a second lens group having a negative refracting power,
      a third lens group having a positive refracting power, and
      a fourth lens group having a positive refracting power,
   said first, second, third and fourth lens groups of said zoom lens being disposed in order from the object side; and
   a solid-state image pickup element for converting an optical image formed by said zoom lens into an electric signal;
   upon zooming from the wide-angle end to the telephoto end, said first lens group moving so as to increase the distance to said second lens group, said second lens group moving to the image side once and then moving so as to return to the object side, and said third lens group moving to the object side;
   said first lens group including only
      a cemented lens including
         a positive lens, and
         a negative lens;
   said positive lens and said negative lens being cemented in order from the object side;
   said cemented lens having a generally positive refracting power;
   said first lens group of said zoom lens being configured so as to satisfy the following conditional expression (1):

$$25 < \nu_{d11} - \nu_{d12} < 50 \tag{1}$$

where $\nu_{d11}$ is the Abbe number of said positive lens of said first lens group and $\nu_{d12}$ is the Abbe number of said negative lens of said first lens group.

* * * * *